(12) United States Patent (10) Patent No.: US 7,746,749 B2
Sonu (45) Date of Patent: Jun. 29, 2010

(54) LOOK-AHEAD MAXIMUM-LIKELIHOOD DATA DETECTOR FOR OPTICAL DISK DRIVES

(75) Inventor: Gene Sonu, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 704 days.

(21) Appl. No.: 11/204,379

(22) Filed: Aug. 15, 2005

(65) Prior Publication Data

US 2007/0036244 A1  Feb. 15, 2007

Related U.S. Application Data

(63) Continuation-in-part of application No. 10/836,607, filed on Apr. 30, 2004, now Pat. No. 7,515,517.

(60) Provisional application No. 60/466,756, filed on Apr. 30, 2003.

(51) Int. Cl.
*G11B 7/00* (2006.01)

(52) U.S. Cl. .................... 369/59.22; 369/59.24

(58) Field of Classification Search ............. 369/59.22, 369/59.24
See application file for complete search history.

(56) References Cited

U.S. PATENT DOCUMENTS

| | | | | |
|---|---|---|---|---|
| 4,328,580 A | * | 5/1982 | Stockham et al. | 714/710 |
| 5,282,216 A | * | 1/1994 | Patel et al. | 369/59.22 |
| 6,233,714 B1 | * | 5/2001 | Hassner et al. | 714/794 |
| 6,278,304 B1 | * | 8/2001 | Livezey | 327/157 |
| 6,493,162 B1 | * | 12/2002 | Fredrickson | 360/51 |
| 6,711,106 B2 | * | 3/2004 | Sasaki | 369/47.28 |
| 6,807,137 B2 | * | 10/2004 | Chuang | 369/59.24 |
| 2004/0170104 A1 | * | 9/2004 | Ernest | 369/59.24 |

* cited by examiner

*Primary Examiner*—Wayne Young
*Assistant Examiner*—Van N Chow
(74) *Attorney, Agent, or Firm*—F. Chau & Associates, LLC

(57) ABSTRACT

An apparatus and method for look-ahead data detection are provided, the apparatus including a boundary function generator, a boundary decision unit in signal communication with the boundary function generator, a next state generator in signal communication with the boundary decision unit, and a sample value generator in signal communication with the boundary decision unit; and the method including receiving a pickup signal sensed from an optical disc, providing a boundary function value responsive to the pickup signal, comparing the boundary function value with a programmable register value, generating decision outputs responsive to the boundary function value with combinational logic, generating a next state and detected data responsive to the decision outputs, and generating a detected sample value responsive to the decision outputs.

5 Claims, 25 Drawing Sheets

Eyes:PR1232ivsPR1221

FIG. 7

$P_{GROUP}$

[ y0  y1  y2  y3  y4  y5 ]
P(1,:) = [-3 -3 -3 -3 -3  -3];
P(2,:) = [-3 -3 -3 -3 -3  -2];
P(3,:) = [-3 -3 -3 -3 -2  -0];
P(4,:) = [-3 -3 -3 -2 -0  +2];
P(5,:) = [-3 -3 -2 -0 +2   2];
P(6,:) = [-3 -3 -2 -0 +2   3];
P(7,:) = [-3 -2 -0 +2  2  +0];
P(8,:) = [-3 -2 -0 +2  3   2];
P(9,:) = [-3 -2 -0 +2  3   3];

$Q_{GROUP}$

|  | Q1 | Q2 | Q3 | Q4 |
|---|---|---|---|---|
| P1 | 70 | 105 | 132 | 143 |
| P2 | 69 | 100 | 123 | 132 |
| P3 | 68 | 87 | 100 | 105 |
| P4 | 67 | 68 | 69 | 70 |
| P5 | 50 | 39 | 36 | 37 |
| P6 | 59 | 44 | 37 | 36 |
| P7 | 17(Eb) | 10(fA) | 15 | 20 |
| P8 | 34 | 15 | 10(Fa) | 11(NG) |
| P9 | 43 | 20 | 11(NG) | 10(Fa) |

Y SAMPLES

FIG. 13

$P_{GROUP}$ 1300 $Q_{GROUP}$

Euclidian Distance Squared

<div style="writing-mode: vertical">Bottom check</div>

|      | Q1b   | Q2b   | Q3b    | Q4b    | Q5b   | Q6b   |
|------|-------|-------|--------|--------|-------|-------|
| P1b  | 70:D  | 71    | 106    | 141    | 168   | 179   |
| P2b  | 71:NG | 70:D  | 105    | 136    | 159   | 168   |
| P3b  | 78:NG | 73:NG | 104:NG | 123    | 136   | 141   |
| P4b  | 93    | 84:NG | 103:E  | 104:NG | 105   | 106   |
| P5b  | 92    | 83    | 84     | 73:NG  | 70:F  | 71    |
| P6b  | 103   | 92    | 93     | 78     | 71    | 70:F  |
| P7b  | 59    | 54    | 43     | 36     | 41    | 46    |
| P8b  | 44    | 75    | 60     | 41     | 36    | 37    |
| P9b  | 95    | 84    | 69     | 46     | 37    | 36    |
| P10b | 18    | 17    | 10     | 19     | 36    | 45    |
| P11b | 43    | 38    | 19     | 10     | 15    | 20    |
| P12b | 68    | 59    | 36     | 15     | 10    | 11    |
| P13b | 79    | 68    | 45     | 20     | 11    | 10    |

Y SAMPLES

Y SAMPLES

Summary of Decision Logic Variable, R0 @ State

0 : px(=3),pm(=2),z(=0),nm(=-2) & nx(=-3)

---

**R0 = A0*B0 + C0**

A0 = ($|y_0-nx|+|y_1-nm|+|y_2-z|+|y_3-pm|$ <=
$|y_0-nm|+|y_1-z|+|y_2-pm|+|y_3-px|$)

B0 = ($|y_0-nx|+|y_1-nm|+|y_2-z|+|y_4-pm|+|y_5-z|$ <=
$|y_0-nm|+|y_1-z|+|y_2-pm|+|y_4-z|+|y_5-nm|$ )

C0 = D0 + E0*F0 where

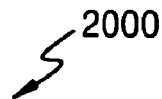

Summary of Decision Logic Variable, R7

@ State 7 : px(=3),pm(=2),z(=0),nm(=-2) & nx(=-3)

R7 = A7*B7 + C7

A7 = ($|y_0-px|+|y_1-pm|+|y_2-z|+|y_3-nm|$ <=
  $|y_0-pm|+|y_1-z|+|y_2-nm|+|y_3-nx|$)

B7 = ($|y_0-px|+|y_1-pm|+|y_2-z|+|y_4-nm|+|y_5-z|$ <=
  $|y_0-pm|+|y_1-z|+|y_2-nm|+|y_4-z|+|y_5-pm|$ )

C7 = D7 + E7*F7 where

| Boundary Fns | Decision Logic Variable, R0=A0*B0+C0 | Next State | Detected Sample Value | Detector Output |
|---|---|---|---|---|
| Positive Transition Checks | A0 B0 | If R0 true, 000(0) else 001(1) | If R0 true, -3 else -2 | If R0 true, 0 else 1 |
| Bottom Envelope Check | C0 | | | |

| Boundary Fns | Decision Logic Variable, R7=A7*B7+C7 | Next State | Detected Sample Value | Detector Output |
|---|---|---|---|---|
| Negative Transition Checks | A7 B7 | If R7 true, 111 else 110 | If R7 true, 3 else 2 | If R7 true, 0 else 1 |
| Top Envelope Check | C7 | | | |

$a1=(\sim b0)$
$b1=(\sim b0)$
$c1=(\sim b0)+(\sim R0)(\sim a0)(\sim c0)+(\sim a0)(b0)+(b0)(c0)+R7(a0)(c0)$ ■ $D0=(a0)(b0)(\sim c0)+(\sim a0)(\sim b0)(c0)$

| Logic | Values |
|---|---|
| R0(~a0)(~c0) | −3 |
| (~R0)(~a0)(~c0)+(a0)(~b0) | −2 |
| (b0)(~c0)+(~b0)(c0) | 0 |
| (~R7)(a0)(c0)+(~a0)(b0) | +2 |
| R7(a0)(c0) | +3 |

# LOOK-AHEAD MAXIMUM-LIKELIHOOD DATA DETECTOR FOR OPTICAL DISK DRIVES

CROSS-REFERENCE TO RELATED APPLICATION

The present application is a continuation-in-part of copending U.S. patent application Ser. No. 10/836,607, entitled "METHOD AND APPARATUS FOR DATA DETECTION IN BLUE LASER OPTICAL DISK DRIVES", filed on Apr. 30, 2004 now U.S. Pat. No. 7,515,517, which, in turn, claims priority to U.S. Provisional Patent Application No. 60/466,756, filed on Apr. 30, 2003, the disclosures of which are incorporated by reference herein in their entireties.

BACKGROUND OF THE INVENTION

The present disclosure relates to disk data detection, and more particularly, to data detectors for optical disk drives. An alternative to the conventional Viterbi detector (VD) is provided.

The Viterbi detector is widely used in the industry for optical disk drive data detection. This is partly because the VD was a proven technology in magnetic hard disk drives over two decades of use. A significant drawback of the Viterbi detector is its speed bottleneck. In the Viterbi detector, three particular operations are to be completed during a single clock cycle. The three operations are Add, Compare and Select (ACS) operations. To combat this speed bottleneck, a radix-x (x=2, 4, etc.) approach may be utilized for a parallel structure to decrease clock frequency, which exacerbates the drawback of increased hardware die size and complexity. In addition, since a Viterbi detector is a linear detector, it lacks the power to correct nonlinear impairments. Thus, the drawbacks and disadvantages of the prior art Viterbi detector include its speed, die size and power.

SUMMARY OF THE INVENTION

An exemplary embodiment apparatus for look-ahead data detection includes a boundary function generator, a boundary decision unit in signal communication with the boundary function generator, a next state generator in signal communication with the boundary decision unit, and a sample value generator in signal communication with the boundary decision unit.

An exemplary embodiment method for look-ahead data detection includes receiving a pickup signal sensed from an optical disc, providing a boundary function value responsive to the pickup signal, comparing the boundary function value with a programmable register value, generating decision outputs responsive to the boundary function value with combinational logic, generating a next state and detected data responsive to the decision outputs, and generating a detected sample value responsive to the decision outputs.

These and other features of the present disclosure will become apparent from the following description of exemplary embodiments, which is to be read in connection with the accompanying drawings.

BRIEF DESCRIPTION OF THE DRAWINGS

The present disclosure presents a method and apparatus of look-ahead maximum-likelihood data detection for optical disk drives in accordance with the following exemplary figures, in which:

FIG. 7 shows a table of state transition paths in accordance with an embodiment of the present disclosure;

FIG. 8 shows a table of Euclidian distances squared for all pairs between P and Q groups in accordance with an embodiment of the present disclosure;

FIG. 13 shows a table of state transition paths in accordance with an embodiment of the present disclosure;

FIG. 14 shows a table of Euclidian distances squared for all pairs between P and Q groups in accordance with an embodiment of the present disclosure;

FIG. 19 shows a table of formulae for the Decision Logic Variable R0 at State 000 in accordance with an embodiment of the present disclosure;

FIG. 20 shows a table of formulae for the Decision Logic Variable R7 at State 111 in accordance with an embodiment of the present disclosure;

FIG. 21 shows a table of Detector Processing for State 000 in accordance with an embodiment of the present disclosure;

FIG. 22 shows a table of Detector Processing for State 111 in accordance with an embodiment of the present disclosure;

FIG. 25 shows a table with logic for a Detected Sample Value Generator for RMS Error Channel Quality Block in accordance with an embodiment of the present disclosure;

DETAILED DESCRIPTION OF PREFERRED EMBODIMENTS

In this disclosure, a data detector is provided that may be used to replace the conventional Viterbi detector (VD) in optical disk drives. The new detector uses look ahead samples as compared to the past samples used in the VD. This feature eliminates the need for the path memory required in the VD, and results in a reduced gate count.

Figure 1:
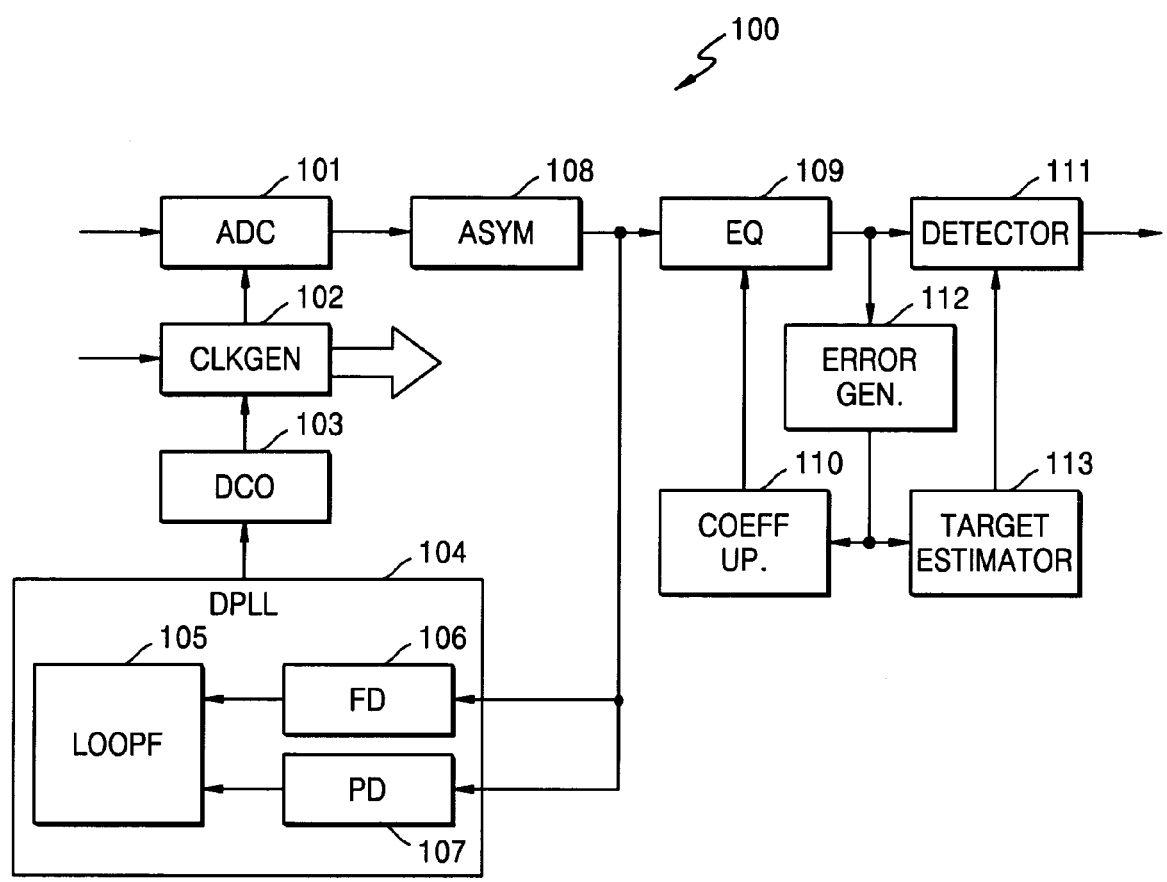
FIG. 1 shows a schematic block diagram for a digital read channel having a detector in accordance with an embodiment of the present disclosure.

As shown in FIG. 1, a digital Partial-Response-Maximum-Likelihood (PRML) read channel is indicated generally by the reference numeral 100. The digital PRML read channel 100 may be used in optical disk drives, for example, and includes a detector block called "Detector". Here, Detector is not a conventional Viterbi detector (VD).

The digital read channel 100 includes major blocks such as an analog-to-digital converter (ADC), asymmetry control (ASYM) in signal communication with the ADC, adaptive equalization (EQ) in signal communication with the ASYM, whose taps are generated by two subsequent blocks of Error-Gen and COEFFUP, where ErrorGen generates sample errors which are fed to COEFFUP to update the taps in EQ, data detection (Detector) in signal communication with the EQ, whose target sample values are generated by two subsequent blocks of ErrorGen and Target Estimator, digital data phase-locked-loop (DPLL) in signal communication with the ASYM for digital data PLL timing offset generation, a data signal digitally controlled oscillator (DCO) in signal communication with the DPLL for the first part of converting a digital timing offset to an analog counterpart and to generate PLL clock to drive clock generation, which generates various clocks used in the PRML block, followed by a current-controlled oscillator, and clock generation (CLKGEN) in signal communication with the DCO, where CLKGEN uses an analog current controlled oscillator and ADC is in signal communication with CLKGEN.

Figure 2:
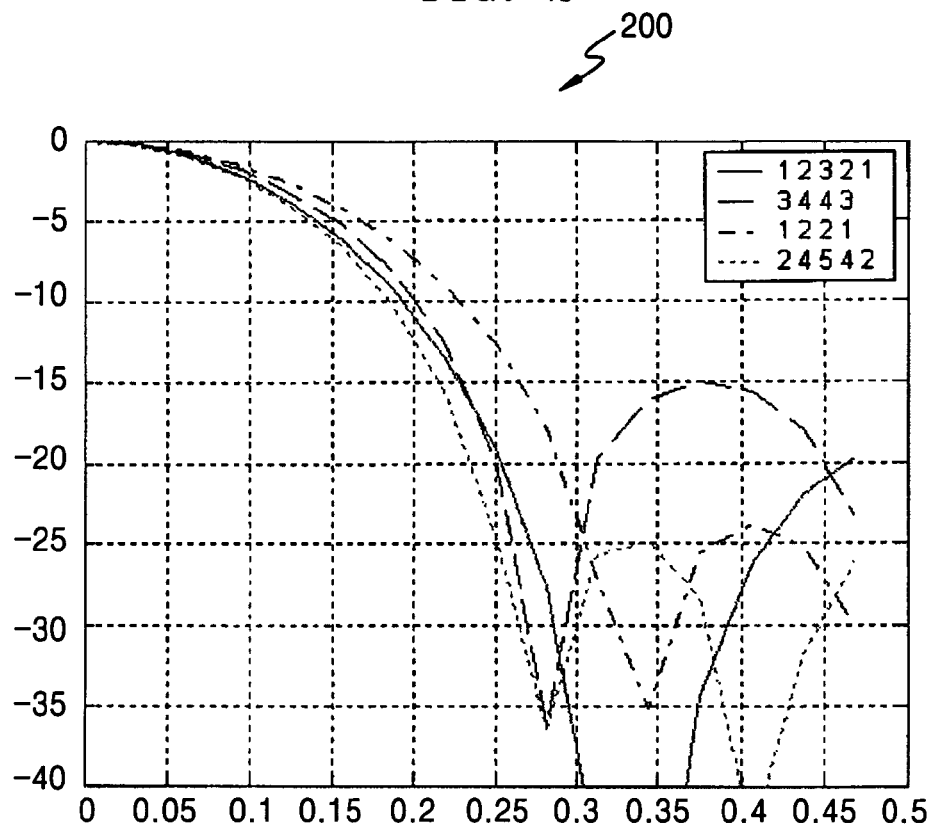
FIG. 2 shows a graphical diagram of Target Channel Magnitudes in accordance with an embodiment of the present disclosure.

Turning to FIG. 2, plots of Target Channel Magnitudes are indicated generally by the reference numeral 200. The Target Channel Magnitudes PR12321, PR3443, PR1221 and PR24542 are plotted as indicated in the legend. Here, PR12321 and PR1221 are chosen for demonstration.

Figure 3:
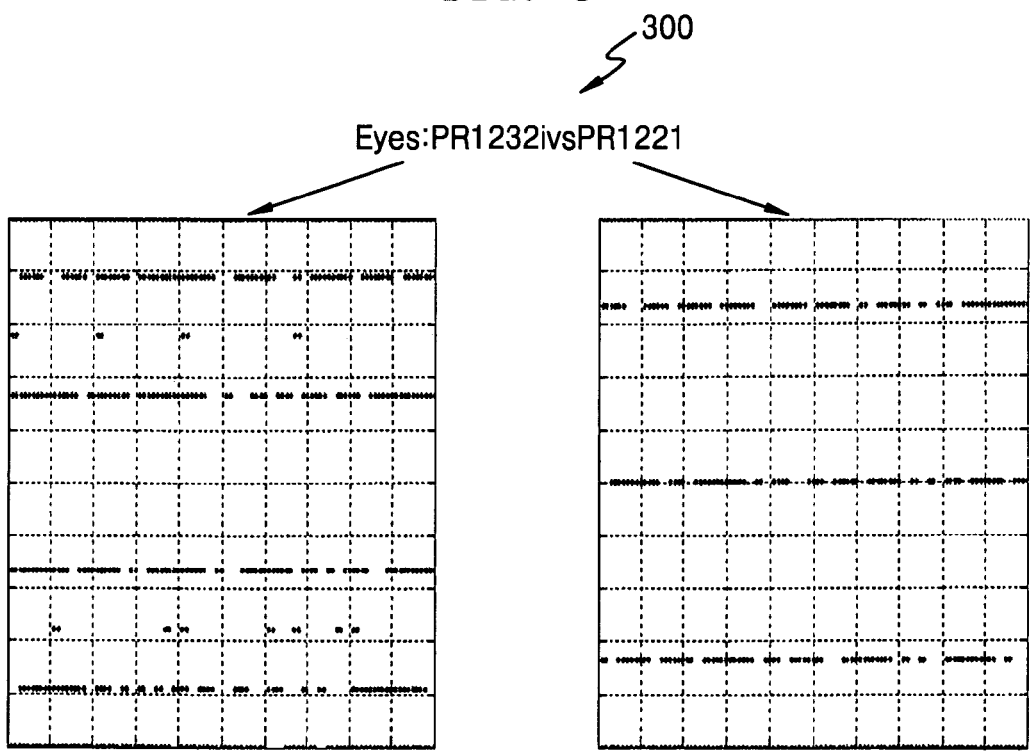
FIG. 3 shows graphical diagrams of Target Sample Values in accordance with an embodiment of the present disclosure.

Turning now to FIG. 3, Target Sample Values after Equalization for PR12321 and PR1221 are indicated generally by the reference numeral 300. Here, 8 levels are given for PR12321 while 5 levels are given for PR1221.

Figure 4:
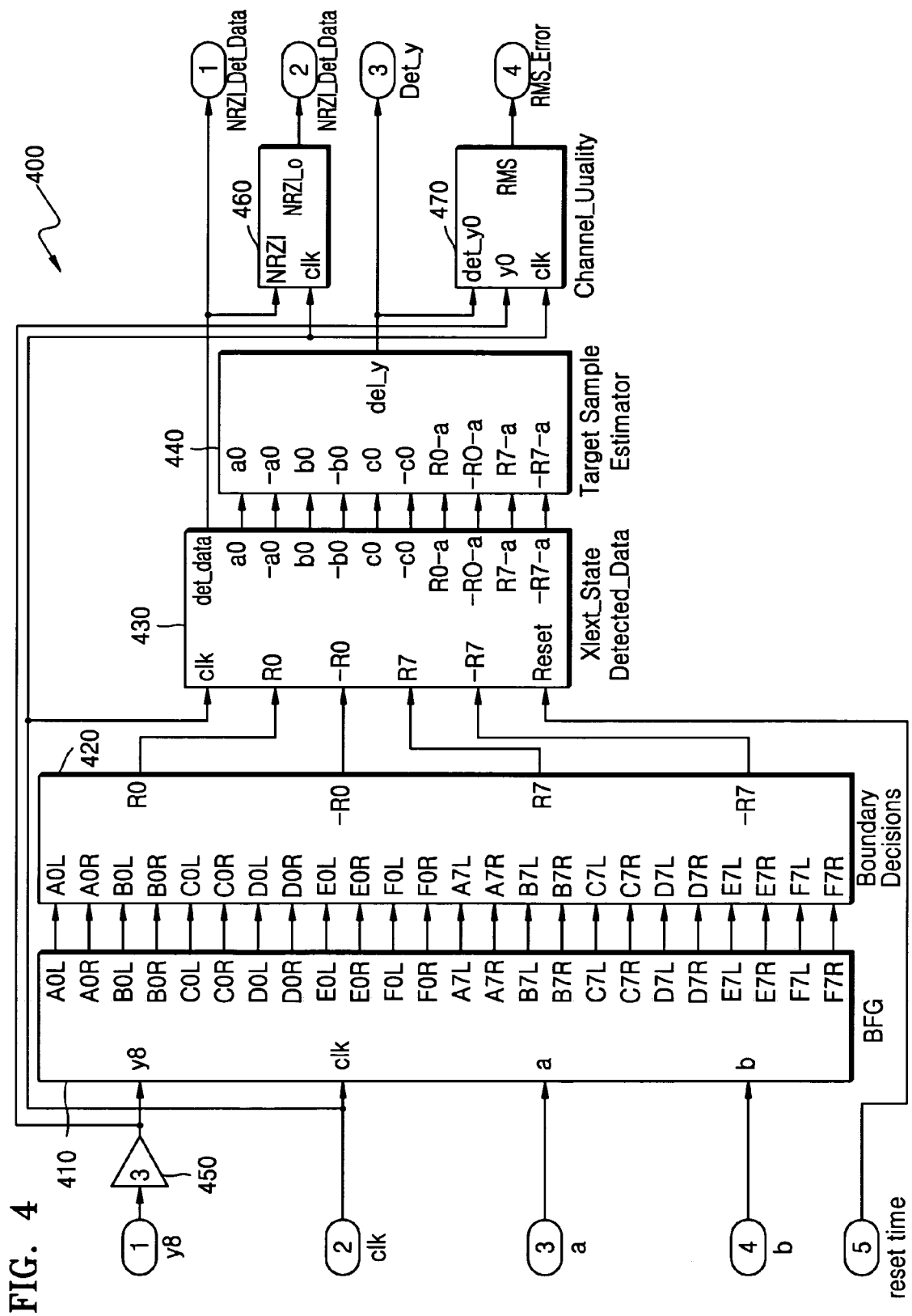
FIG. 4 shows a schematic circuit diagram for a detector in accordance with an embodiment of the present disclosure.

As shown in FIG. 4, a top level diagram of one detector embodiment is indicated generally by the reference numeral 400. The detector 400 includes an amplifier ("Gain") 450, a boundary function generator ("BFG") 410 in signal communication with the amplifier 450, a decision logic variable generator ("Boundary Decisions") 420 in signal communication with the generator 410, a next state and detector output logic ("Next_State, Detected_Data") 430 in signal communication with the generator 420, a target sample estimator ("TSE") 440 in signal communication with the logic 430, an NRZI-NRZ converter ("NRZ_Gen") 460 in signal communication with the logic 430, and a channel quality block ("Channel_Quality") 470 in signal communication with the amplifier 450 and the estimator 440.

Figure 5:
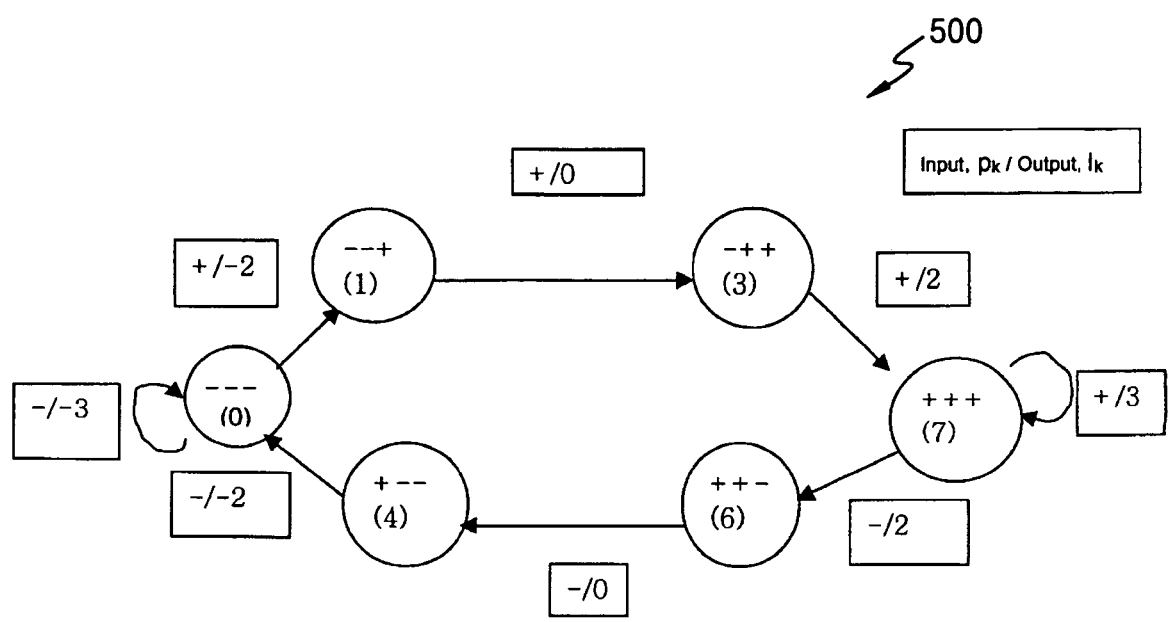
FIG. 5 shows a schematic State Diagram for a detector in accordance with an embodiment of the present disclosure.

Turning to FIG. 5, a State Diagram for a PR1221 Detector embodiment is indicated generally by the reference numeral 500. In this diagram, the state is defined as:

$$s_k = (p_{k-3}, p_{k-2}, p_{k-1}) \quad \text{(Eqn. 1)}$$

where $p_{k-1}$ is the previous input from the set $\{+\frac{1}{2}, -\frac{1}{2}\}$, $p_{k-2}$ is the next previous input, and so on.

and the output is defined as:

$$I_k = (a\, p_k + b\, p_{k-1} + b\, p_{k-2} + a\, p_{k-3}) \quad \text{(Eqn. 2)}$$

where $p_k$ is input symbol, $\{+\frac{1}{2}, -\frac{1}{2}\}$, a=1 and b=2.

In the state diagram 500 at State 0=$(-\frac{1}{2}, -\frac{1}{2}, -\frac{1}{2})$, which is denoted (− − −) using the sign of $p_k$ to define the state, a negative input Pk produces an output $I_k$ of −3 and no change of state, and a positive input produces an output of −2 and a change of state to State 1. At State 1 or (− − +), a positive input produces an output of 0 and a change of state to State 3. At State 3 or (− + +), a positive input produces an output of +2 and a change of state to State 7. At State 7 or (+ + +), a positive input $p_k$ produces an output $I_k$ of +3 and no change of state, and a negative input produces an output of +2 and a change of state to State 6. At State 6 or (+ + −), a negative input $p_k$ produces an output $I_k$ of 0 and a change of state to State 4. At State 4 or (+ − −), a negative input $p_k$ produces an output $I_k$ of −2 and a change of state to State 0.

Figure 6:
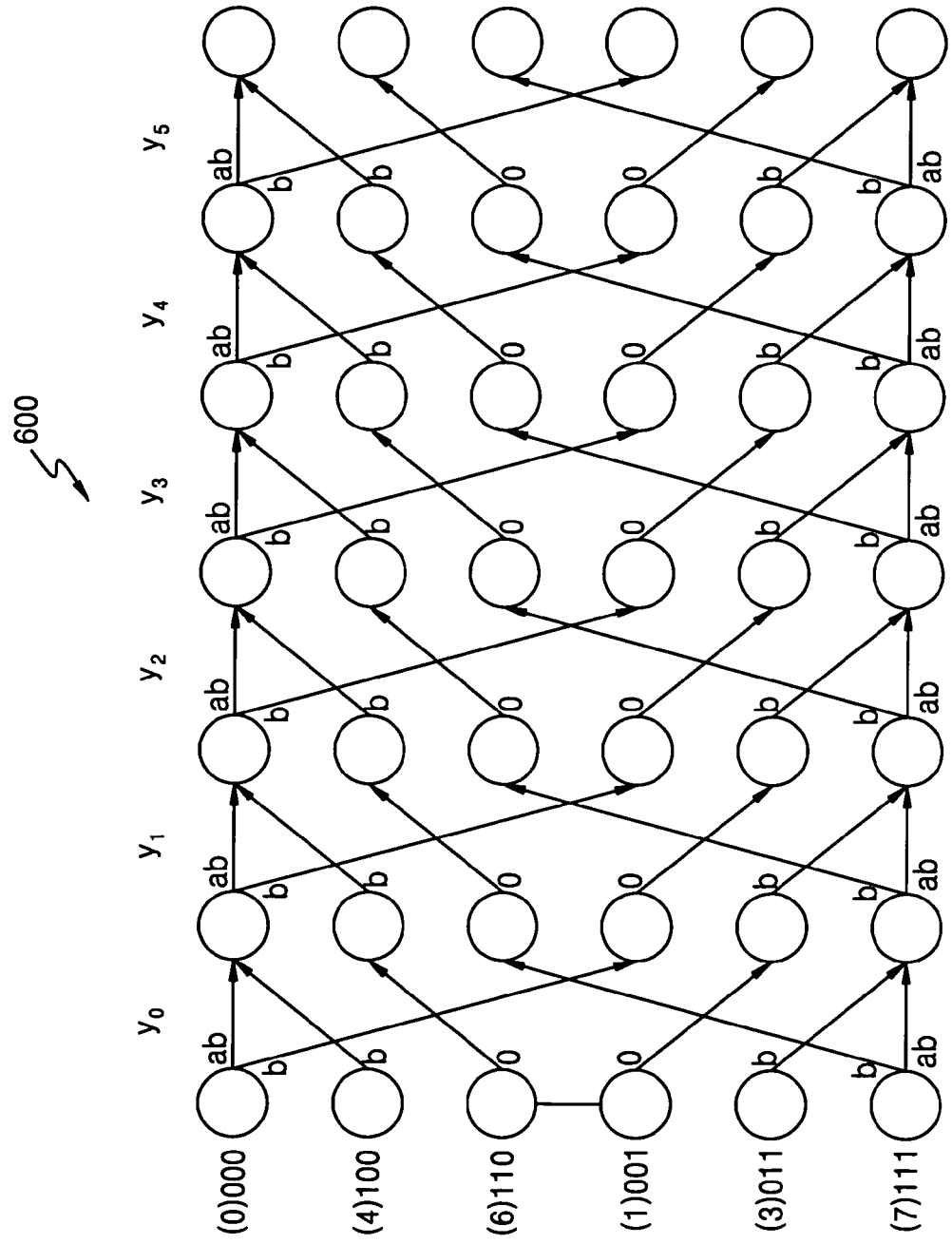
FIG. 6 shows a schematic Trellis diagram for a PR1221 EFM Detector with 5 Look-Ahead-Samples in accordance with an embodiment of the present disclosure.

Turning now to FIG. 6, a Trellis for a PR1221 EFM Detector with 5 Look-Ahead-Samples is indicated generally by the reference numeral 600. The Trellis 600 shows the output $I_k$ and next state with the variables a and b of Equation 2 variable. Thus, from State 0, an output of −a−b is produced for no change in state, and an output of −b is produced for a change to State 1. From State 4, an output of −b is produced for a change to State 1. From State 6, an output of 0 is produced for a change to State 4. From State 1, an output of 0 is produced for a change to State 3. From State 3, an output of +b is produced for a change to State 7. From State 7, an output of +a+b is produced for no change in state, and an output of +b is produced for a change to State 6. Note that in this Figure, states such as State 0, which were denoted $(-\frac{1}{2}-\frac{1}{2}-\frac{1}{2})$ or (− − −) using the sign of $p_k$ to define the state, are now denoted (0 0 0) using the binary input symbols of "0" and "1".

As shown in FIG. 7, all output paths having six consecutive samples from State 0 at t=k, which are grouped into P and Q groups, are indicated generally by the reference numeral 700. Here, the P group consists of all the paths via next State 0 at t=k+1, while the Q group consists of all the paths via next State 1 at t=k+1. Thus, the six outputs from State 0 via next State 0 always begin with −3 since this is the output at next State 0, and include nine possible variations. The six outputs from State 0 via next State 1 always begin with −2 since this is the output at next State 1, and include four possible variations.

Turning to FIG. 8, Euclidian distances squared for all pairs between P and Q groups are indicated generally by the reference numeral 800. Here, P5 through P9 are considered along with all Q paths to generate boundary functions related to signal transition detections, where Yk is the actual sample value entering the detector while $I_k$ is the target sample value.

$$Fa=y0+2y1+2y2+y3; A=(Fa<=0) \qquad \text{(Eqn. 3)}$$

$$Fb=y0+2y1+2y2-2y4-2y5; B=(Fb<=-2.5) \qquad \text{(Eqn. 4)}$$

For example, the Euclidean distance squared (EDS) between P5 and Q1 is EDS(P5, Q1)=EDS([−3−3−2−0+2+2], [−2−0+2+2+0−2])=1+9+16+4+4+16=50. The Euclidean distance squared between P7 and Q2 is EDS (P7, Q2)=EDS([−3−2−0+2+2+0], [−2−0+2+3+2+0])=1+4+4+1+0+0=10, which turns out to be a minimum distance event since no other pairing of a P and a Q produces a lower value.

Figure 9:
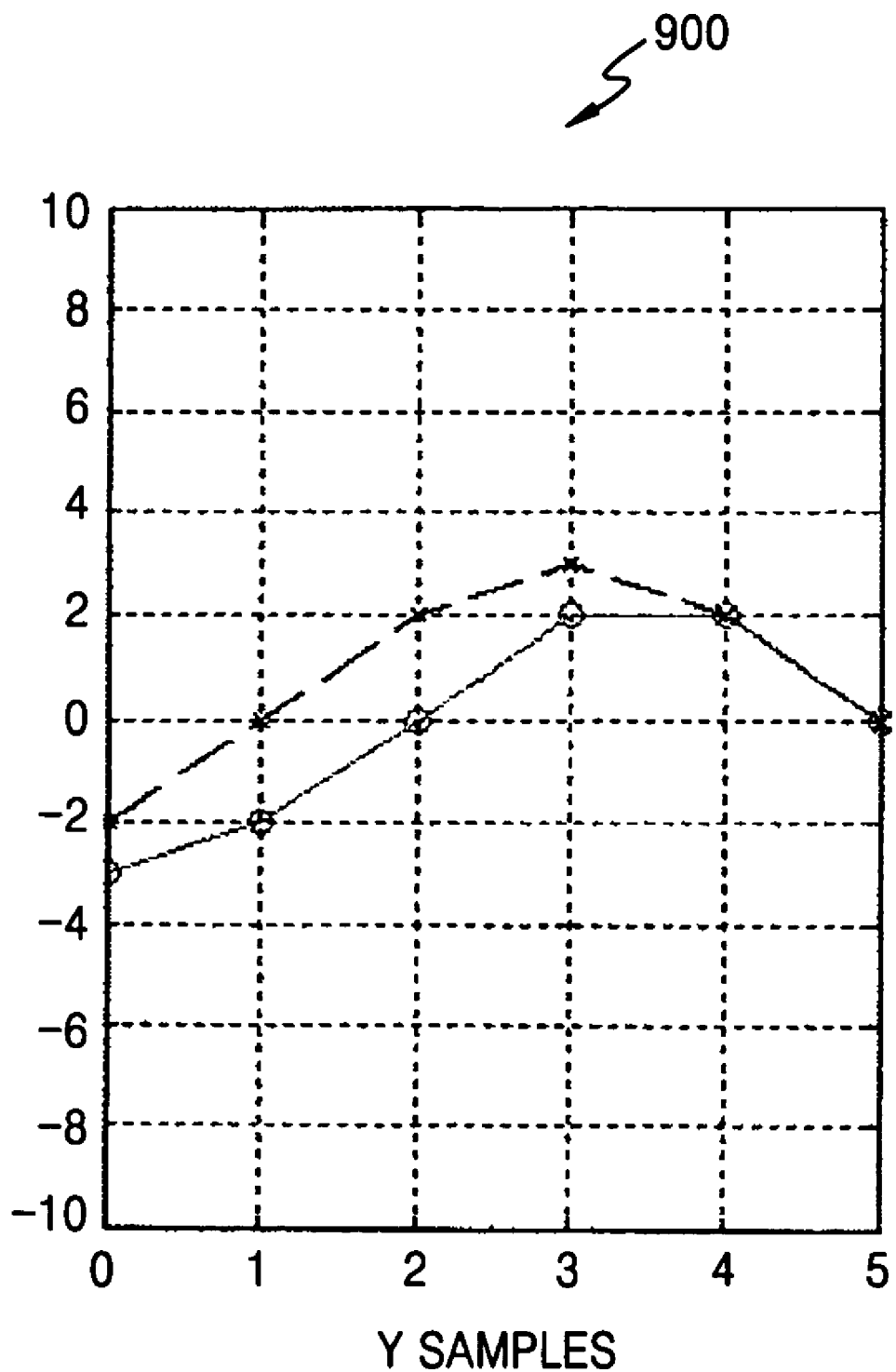
FIG. 9 shows a graphical diagram for a minimum distance event in accordance with an embodiment of the present disclosure.

Turning now to FIG. 9, a minimum distance event related to a positive transition detection event at State 000 is indicated generally by the reference numeral 900. This event involves P7 ("O" in the plot) and Q2 ("X" in the plot). From this event, the boundary linear function of Fa is derived per Equation 3 as well as decision logic for A, defined as Fa<=0. If A is true, P7 is chosen over Q2, which means the next state will be the state of 000 over 001 and the corresponding target sample value at t=k is −3 over −2. The decision logic variable is defined as:

$$C=\{Error2(P7)<=Error2(Q2)\}, \qquad \text{(Eqn. 5)}$$

or $$(y0+3)2+(y1+2)2+(y2+0)2+(y3-2)2<=(y0+2)2+(y1+0)2+(y2-2)2+(y3-3)2 \qquad \text{(Eqn. 6)}$$

The boundary function Fa is defined in Equation 3, with A=(Fa <=0). Thus, if A is true, the next state is 0 and the sample value is −3; otherwise the next state is 1 and the sample value is −2.

Figure 10:
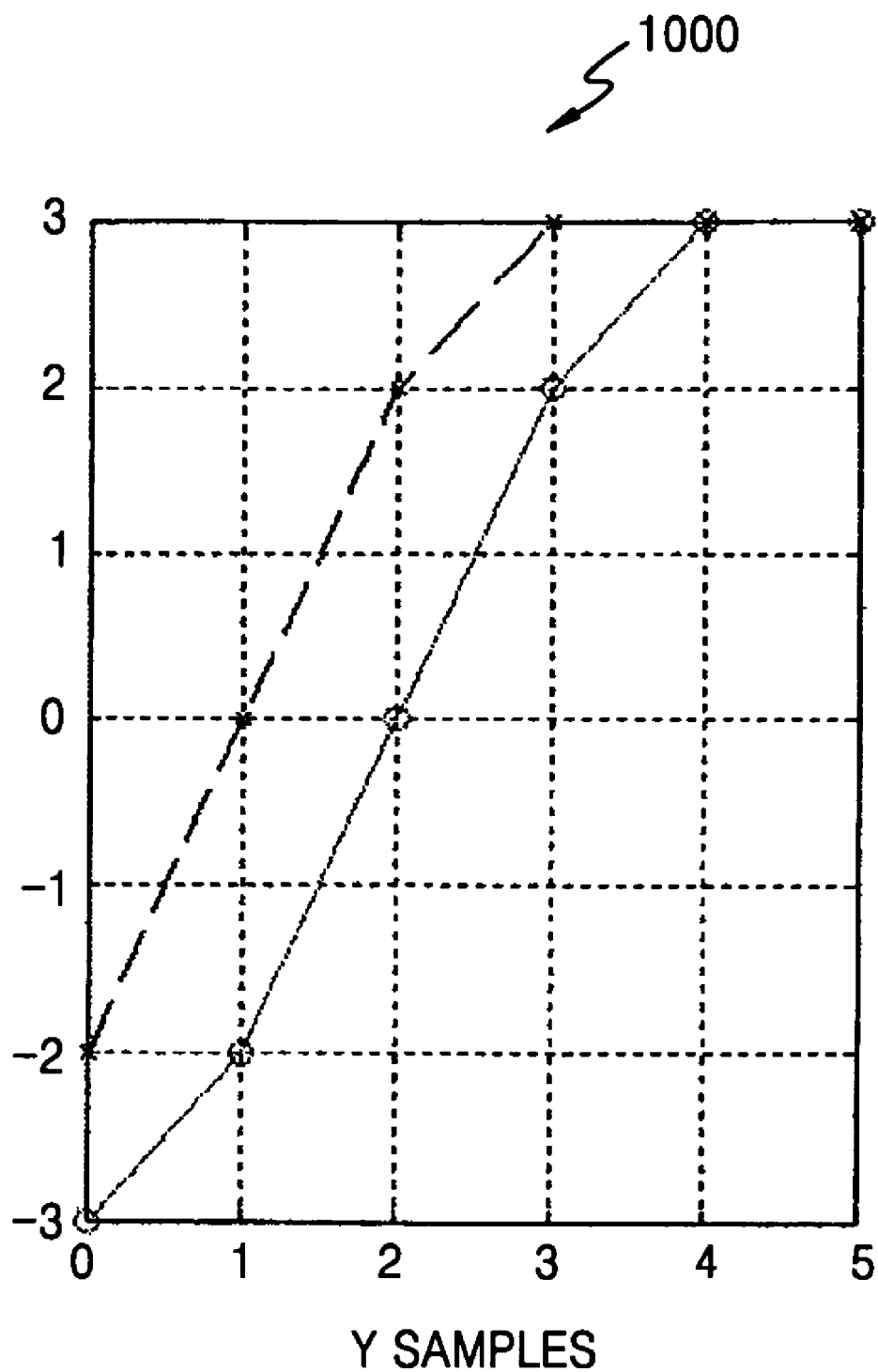
FIG. 10 shows a graphical diagram for another minimum distance event in accordance with an embodiment of the present disclosure.

As shown in FIG. 10, another minimum distance event related to a positive transition detection at State 000 is indicated generally by the reference numeral 1000. This event involves P9 ("O" in the plot) and Q4 ("X" in the plot). It turns out that the same boundary function Fa and the same decision logic for A are derived from this event as for the pair P7 and Q2 discussed above, which is also true for the pair of P8 and Q3.

Figure 11:
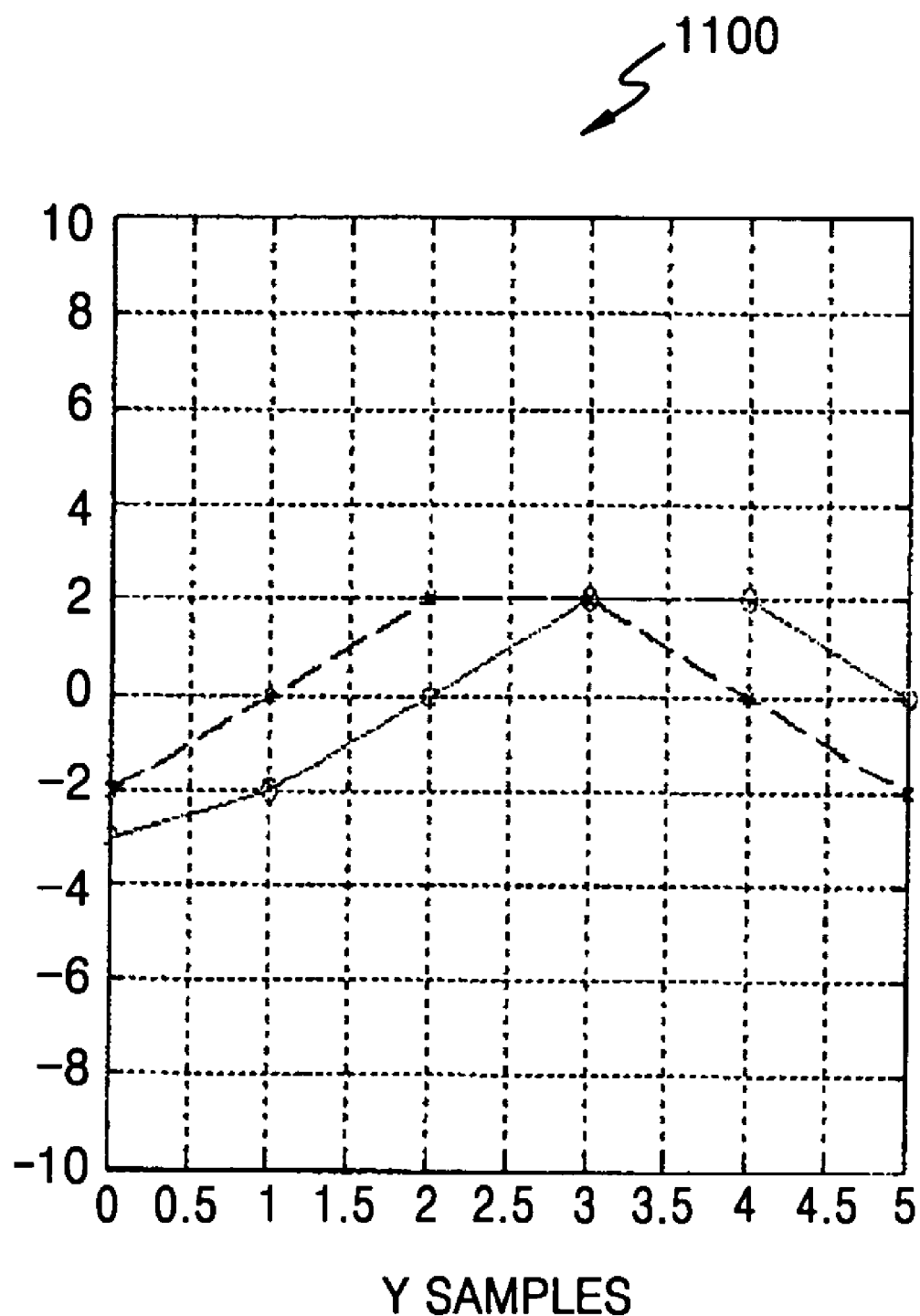
FIG. 11 shows a graphical diagram for yet another minimum distance event in accordance with an embodiment of the present disclosure.

Turning to FIG. 11, another minimum distance event related to a positive transition detection at State 000 is indicated generally by the reference numeral 1100. This event involves P7 ("O" in the plot) and Q1 ("X" in the plot). This event produces a new boundary of Fb and new decision logic for B. The new decision logic variable is defined as:

$$B=\{Error2(P7)<=Error2(Q1)\} \qquad \text{(Eqn. 7)}$$

The new boundary function and logic, from Equation 4, is:

$$Fb=y0+2y1+2y2-2y4-2y5<=-2.5, \qquad \text{(Eqn. 8)}$$

where B=(Fb<=−2.5)

Thus, if B is true or "1", the next state is 0 and the sample value=−3. If B is false or "0", the next state is 1 and the sample value is −2.

Figure 12:
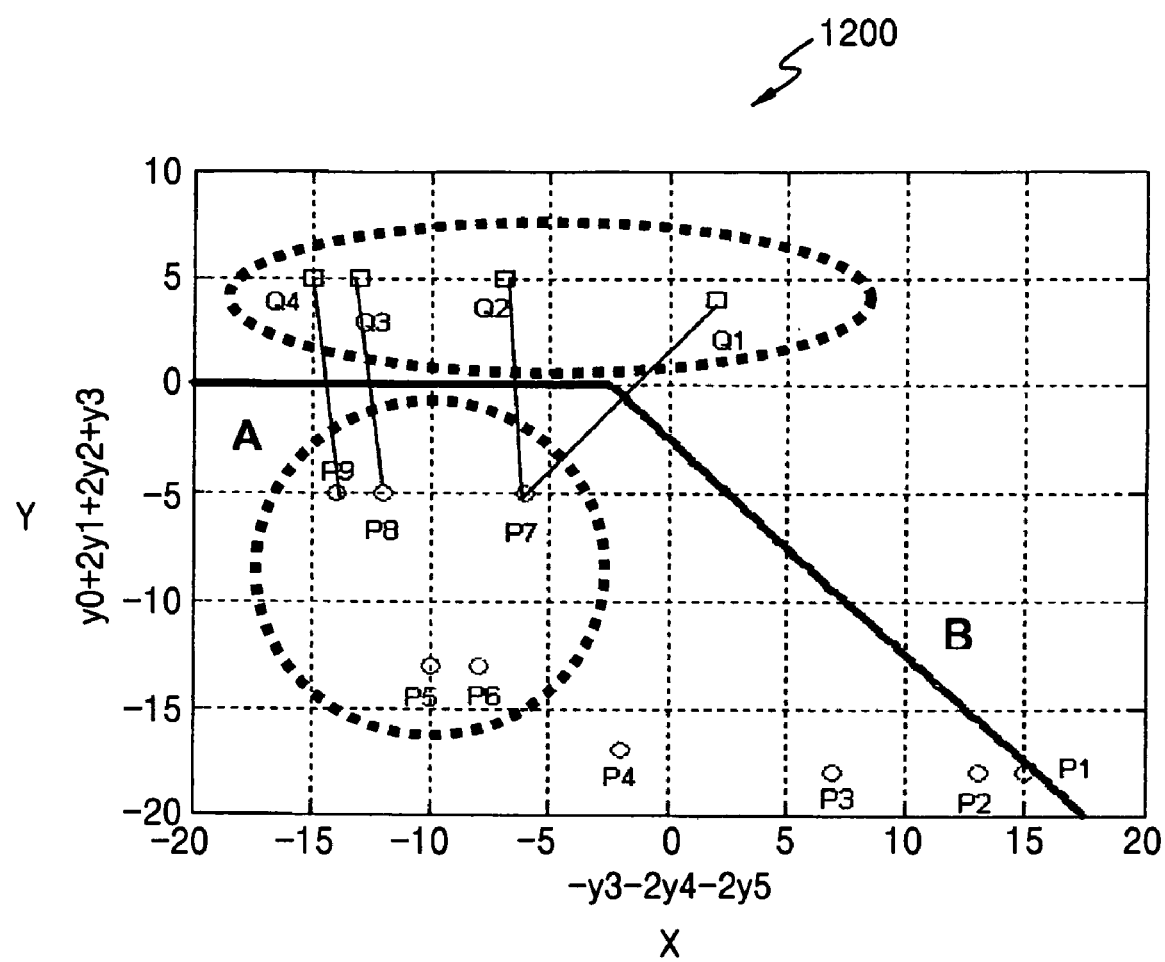
FIG. 12 shows a graphical diagram for two boundary functions in accordance with an embodiment of the present disclosure.

Turning now to FIG. 12, the two boundary functions of Fa and Fb are indicated generally by the reference numeral 1200, where the Y-axis is the impulse response of $(y_0+2y_1+2y_2+y_3)$ and the X-axis is an enhancer of $(-y_3-2y_4-2y_5)$. The points P5, P6, P7, P8, and P9 are included in the bottom portion while the points Q1, Q2, Q3 and Q4 are included in the top portion. The boundary plot for positive transition checks uses Fa=(Y=0) and Fb=(Y=−X−2.5). Here, it can be seen that these two functions provide an optimum boundary for separating the Q group from P5 through P9.

Figure 13:
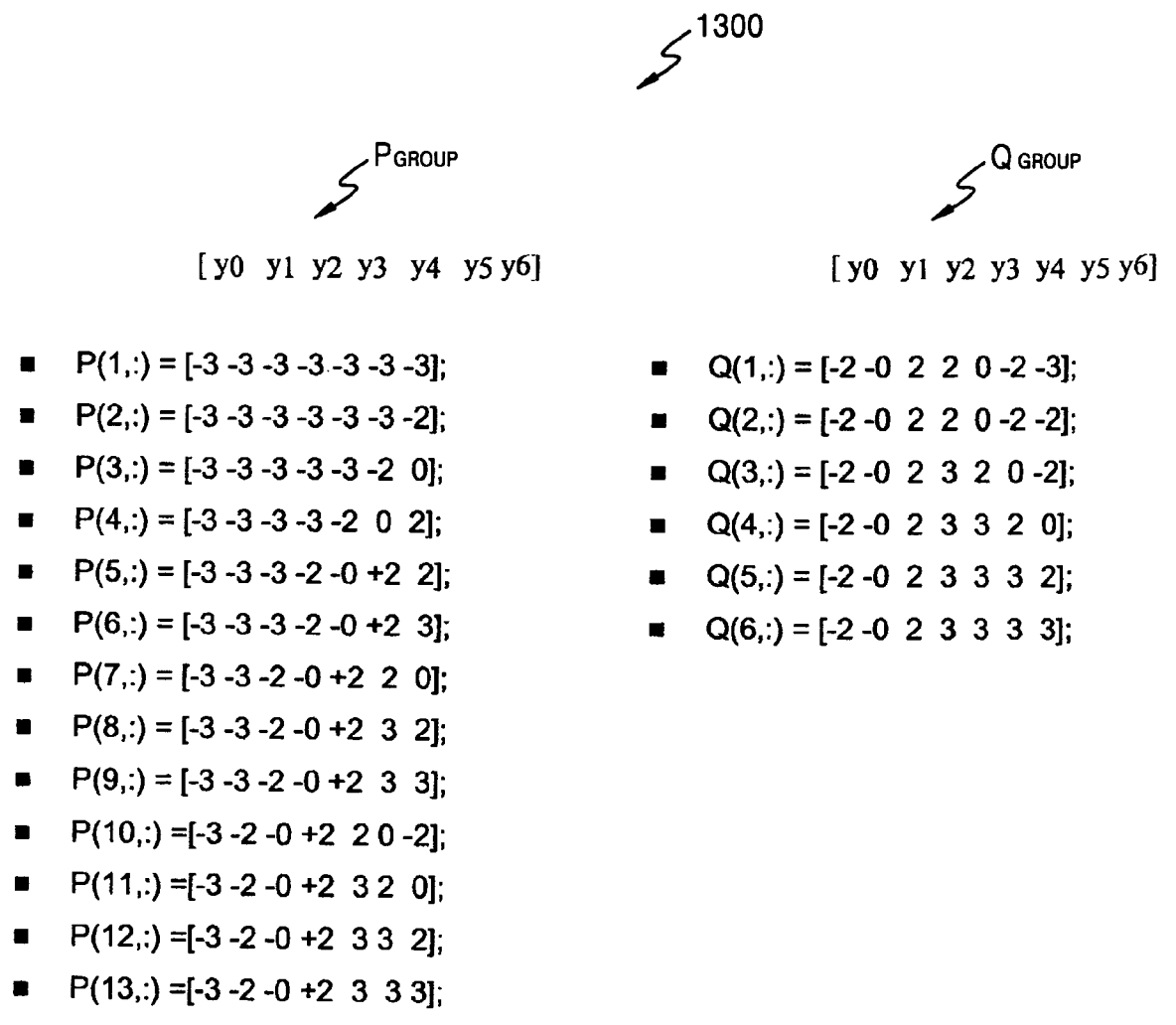

As shown in FIG. 13. All paths from state 000 at t=k, which are grouped into P and Q groups, are indicated generally by the reference numeral 1300. This is similar to FIG. 7, but here 6 look-ahead samples are used instead of 5. P group consists of paths via the next state 0, while Q group consists of paths via the next state 1, each over 7 total samples. One extra look-ahead-sample is found to improve the reliability of decoding samples related to the bottom envelope of the signal, which only involves paths from P1 to P6 along with all Q paths. The P group consists of all the paths via state 000 at t=k+1, while the Q group consists of all the paths via state 001 at t=k+1.

Turning to FIG. 14, Euclidian distances squared for all pairs between P and Q groups are indicated generally by the reference numeral 1400. Here, P1 through P6 are considered along with all Q paths to generate boundary functions related to signal bottom envelope samples. The pairs P1/Q1, P2/Q2, P5/Q5 and P6/Q6 each turn out to be minimum distance events since no other considered pairing of a P and a Q produces a lower distance value than 70. The logic for P1/Q1 and P2/Q2 is defined as D, while the logic for P5/Q5 and P6/Q6 is defined as F.

Figure 15:
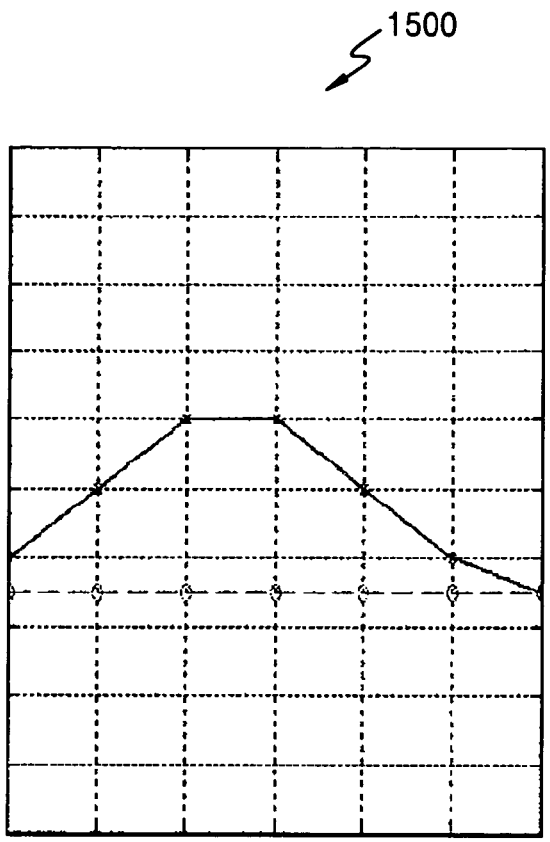
FIG. 15 shows a graphical diagram for a minimum distance event in accordance with an embodiment of the present disclosure.

Turning now to FIG. 15, a minimum distance event related to signal bottom envelope detection at State 000 is indicated generally by the reference numeral 1500. This event involves P1 ("O" in the plot) and Q1 ("X" in the plot). From this event, the boundary linear function of Fd is derived as well as decision logic for D, defined as Fd<=0. If D is true, P1 is chosen over Q1, which means the next state will be a state of 000 over 001 and the corresponding target sample value at t=k is −3 over −2. Here, the bottom envelope check defines the decision logic variable as:

$$D=\{Error2(P1)<=Error2(Q1)\} \qquad \text{(Eqn. 9)}$$

and defines the boundary function as:

$$Fd=y0+3y1+5y2+5y3+3y4+y5<=-19, \qquad \text{(Eqn. 10)}$$

where D=(Fd<=−19)

Figure 16:
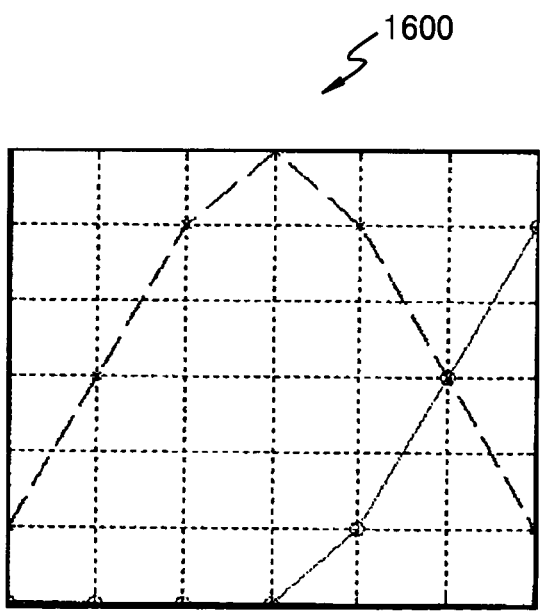
FIG. 16 shows a graphical diagram for a non-minimum distance event in accordance with an embodiment of the present disclosure.

As shown in FIG. 16, a non-minimum distance event related to bottom envelope detection at State 000 is indicated generally by the reference numeral 1600. This event involves P4 ("O" in the plot) and Q3 ("X" in the plot). The event is a non-minimum distance event since its associated distance measure of 103 is greater than the minimum distance measure of 70. From this event, the boundary linear function of Fe is derived as well as decision logic for E, defined as Fe<=0. If E is true, P4 is chosen over Q3 which means the next state will be a state of 000 over 001 and the corresponding target sample value at t=k is −3 over −2. Here, the bottom envelope check defines the decision logic variable as:

$$E=\{Error2(P4)<=Error2(Q3)\} \qquad \text{(Eqn. 11)}$$

and defines the boundary function as:

$$Fe=y0+3y1+5y2+5y3+3y4+y5-y5-4y6<=-9.5, \qquad \text{(Eqn. 12)}$$

where D=(Fe<=−9.5)

Figure 17:
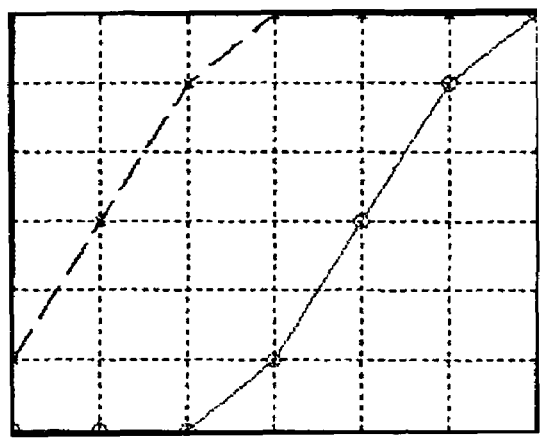
FIG. 17 shows a graphical diagram for a minimum distance event in accordance with an embodiment of the present disclosure.

Turning to FIG. 17, a minimum distance event related to bottom envelope detection at State 000 is indicated generally by the reference numeral 1700. This event involves P6 ("O" in the plot) and Q6 ("X" in the plot). From this event, the boundary linear function of Ff is derived as well as decision logic for F, defined as Ff<=0. If F is true, P6 is chosen over Q6 which means the next state will be state of 000 over 001 and the corresponding target sample value at t=k is −3 over −2. Here, the bottom envelope check defines the decision logic variable:

$$F=\{Error2(P6)<=Error2(Q6)\} \quad \text{(Eqn. 13)}$$

and defines the boundary function as:

$$Ff=y0+3y1+5y2+5y3+3y4+y5<=0, \quad \text{(Eqn. 14)}$$

where F=(Ff<=0)

Figure 18:
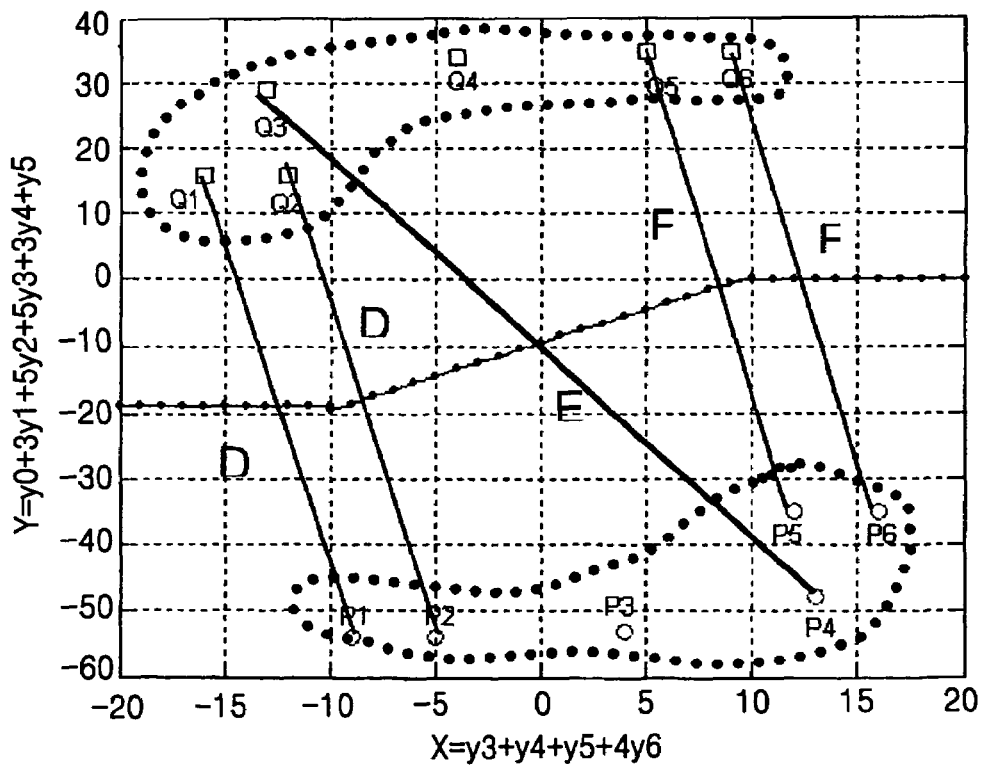
FIG. 18 shows a graphical diagram for three boundary functions in accordance with an embodiment of the present disclosure.

Turning now to FIG. 18, the three boundary functions of Fd, Fe and Ff are indicated generally by the reference numeral 1800, where the Y-axis is defined as a target bottom shape of $(y_0+3y_1+5y_2+5y_3+3y_4+y_5)$ and the X-axis is an enhancer of $(-y_3-y_4-y_5+4y_6)$. It can be seen that these three functions provide an optimum boundary for the Q group separating from P1 through P6. Here, the boundary logic variable is:

$$C=D+E*F \quad \text{(Eqn. 15)}$$

If C='1' or true, P1, P2, P3, P4, P5 and P6 are selected over Q group.

As shown in FIG. 19, a Decision Logic Variable R0 at State 000 is indicated generally by the reference numeral 1900. The decision logic variable R0 at State 0 uses the estimates of the target samples of px(=3), pm(=2), z(=0), nm(=−2) and nx(=−3), which is generated by the target estimator block in FIG. 1 for:

$$R0=A0*B0+C0 \quad \text{(Eqn. 16)}$$

$$A0=(|y_0-nx|+|y_1-nm|+|y_2-z|+|y_3-Pm|<=|y_0-nm|+|y_1-z|+|y_2-pm|+|y_3-px|) \quad \text{(Eqn. 17)}$$

$$B0=(|y_0-nx|+|y_1-nm|+|y_2-z|+|y_4-pm|+|y_5-z|<=|y_0-nm|+|y_1-z|+|y_2-pm|+|y_4-z|+|y_5-nm|) \quad \text{(Eqn. 18)}$$

$$C0=D0+E0*F0, \text{ where} \quad \text{(Eqn. 19)}$$

$$D0=(|y_0-nx|+|y_1-nx|+|y_2-nx|+|y_3-nx|+|y_4-nx|+|y_5-nx|<=|y_0-nm|+|y_1-z|+|y_2-pm|+|y_3-pm|+|y_4-z|+|y_5-nm|) \quad \text{(Eqn. 20)}$$

$$E0=(|y_0-nx|+|y_1-nx|+|y_2-nx|+|y_3-nx|+|y_4-nm|+|y_6-pm|<=|y_0-nm|+|y_1-z|+|y_2-pm|+|y_3-px|+|y_4-pm|+|y_6-nm|) \quad \text{(Eqn. 21)}$$

$$F0=(|y_0-nx|+|y_1-nx|+|y_2-nx|+|y_3-nm|+|y_4-z|+|y_5-pm|<=|y_0-nm|+|y_1-z|+|y_2-pm|+|y_3-px|+|y_4-px|+|y_5-px|) \quad \text{(Eqn. 22)}$$

Turning to FIG. 20, a Decision Logic Variable R7 at State 111 is indicated generally by the reference numeral 2000. The decision logic variable R7 at State 7 uses the estimates of the target samples of px(=3), pm(=2), z(=0), nm(=−2) & nx(=−3), which is generated by the VLA block in FIG. 1 for:

$$R7=A7*B7+C7 \quad \text{(Eqn. 23)}$$

$$A7=(|y_0-px|+|y_1-pm|+|y_2-z|+|y_3-nm|<=|y_0-pm|+|y_1-z|+|y_2-nm|+|y_3-nx|) \quad \text{(Eqn. 24)}$$

$$B7=(|y_0-px|+|y_1-pm|+|y_2-z|+|y_4-nm|+|y_5-z|<=|y_0-pm|+|y_1-z|+|y_2-nm|+|y_4-z|+|y_5-pm|) \quad \text{(Eqn. 25)}$$

$$C7=D7+E7*F7, \text{ where} \quad \text{(Eqn. 26)}$$

$$D7=(|y_0-px|+|y_1-px|+|y_2-px|+|y_3-px|+|y_4-px|+|y_5-pX|<=|y_0-pm|+|y_1-z|+|y_2-nm|+|y_3-nm|+|y_4-z|+|y_5-pm|) \quad \text{(Eqn. 27)}$$

$$E7=(|y_0-px|+|y_1-px|+|y_2-px|+|y_3-px|+|y_4-pm|+|y_6-nm|<=|y_0-pm|+|y_1-z|+|y_2-nm|+|y_3-nx|+|y_4-nm|+|y_6-pm|) \quad \text{(Eqn. 28)}$$

$$F7=(|y_0-px|+|y_1-px|+|y_2-px|+|y_3-pm|+|y_4-z|+|y_5-nm|<=|y_0-pm|+|y_1-z|+|y_2-nm|+|y_3-nx|+|y_4-nx|+|y_5-nx|) \quad \text{(Eqn. 29)}$$

Turning now to FIG. 21, Detector Processing at State 000 is indicated generally by the reference numeral 2100. Here, boundary functions for two positive transition checks A0 and B0 are defined, as well as a boundary function for a bottom envelope check C0. The decision logic variable is defined as:

$$R0=A0*B0+C0 \quad \text{(Eqn. 30)}$$

The next state is State 0=000 if R0 is true, or else State 1=001 if R0 is not true. The detected sample value is −3 if R0 is true, or else −2 if R0 is not true. The detector output is 0 if R0 is true, or else 1 if R0 is not true.

As shown in FIG. 22, Detector Processing at State 111 is indicated generally by the reference numeral 2200. Here, boundary functions for two negative transition checks A7 and B7 are defined, as well as a boundary function for a bottom envelope check C7. The decision logic variable is defined as:

$$R7=A7*B7+C7 \quad \text{(Eqn. 31)}$$

The next state is State 7=111 if R7 is true, or else State 6=110 if R0 is not true. The detected sample value is 3 if R7 is true, or else 2 if R7 is not true. The detector output is 0 if R7 is true, or else 1 if R7 is not true.

Figure 23:
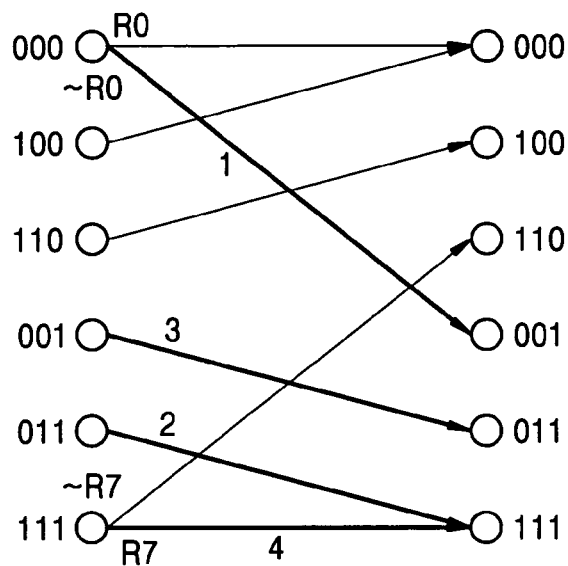
FIG. 23 shows a schematic trellis diagram for Next State Equations in accordance with an embodiment of the present disclosure.

Turning to FIG. 23, a transition diagram for Next State Equations is indicated generally by the reference numeral 2300. Here, the present state is defined as (a0 b0 c0) while the next state is (a1 b1 c1). Since we define the state in FIG. 5 as (pk−3 pk−2 pk−1), a1 and b1 are shifted from a0 and b0, respectively while c1 depends on decisions and the present state, as shown below. Thus, the next state equations are:

$$a1=(\sim b0) \quad \text{(Eqn. 32)}$$

$$b1=(\sim b0) \quad \text{(Eqn. 33)}$$

$$c1=(\sim b0)+(\sim R0)(\sim a0)(\sim c0)+(\sim a0)(b0)+(\sim b0)(c0)+R7(a0)(c0) \quad \text{(Eqn. 34)}$$

Figure 24:
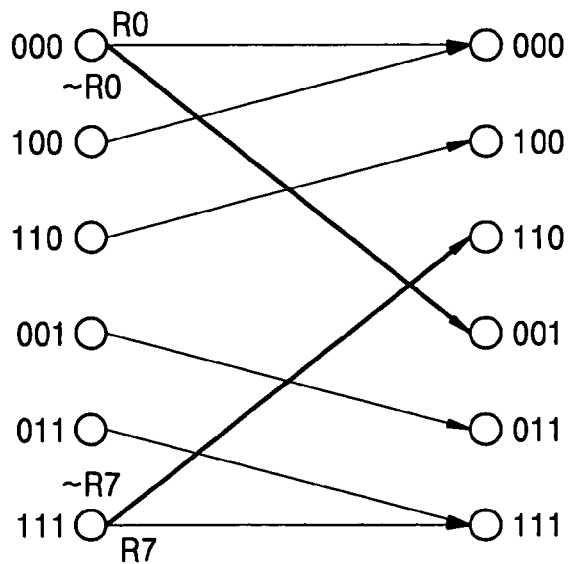
FIG. 24 shows a schematic trellis diagram for a Detector Output Equation in accordance with an embodiment of the present disclosure.

Turning now to FIG. 24, a transition diagram for a Detector Output Equation is indicated generally by the reference numeral 2400. The detector output equation is:

$$D0=(a0)(b0)(\sim c0)+(\sim a0)(\sim b0)(c0) \quad \text{(Eqn. 35)}$$

As shown in FIG. 25, a Detected Sample Value Generator for a RMS Error Channel Quality Block is indicated generally by the reference numeral 2500. Here, the logic for sample value detection in the left column corresponds to the sample values in the right column.

Figure 26:
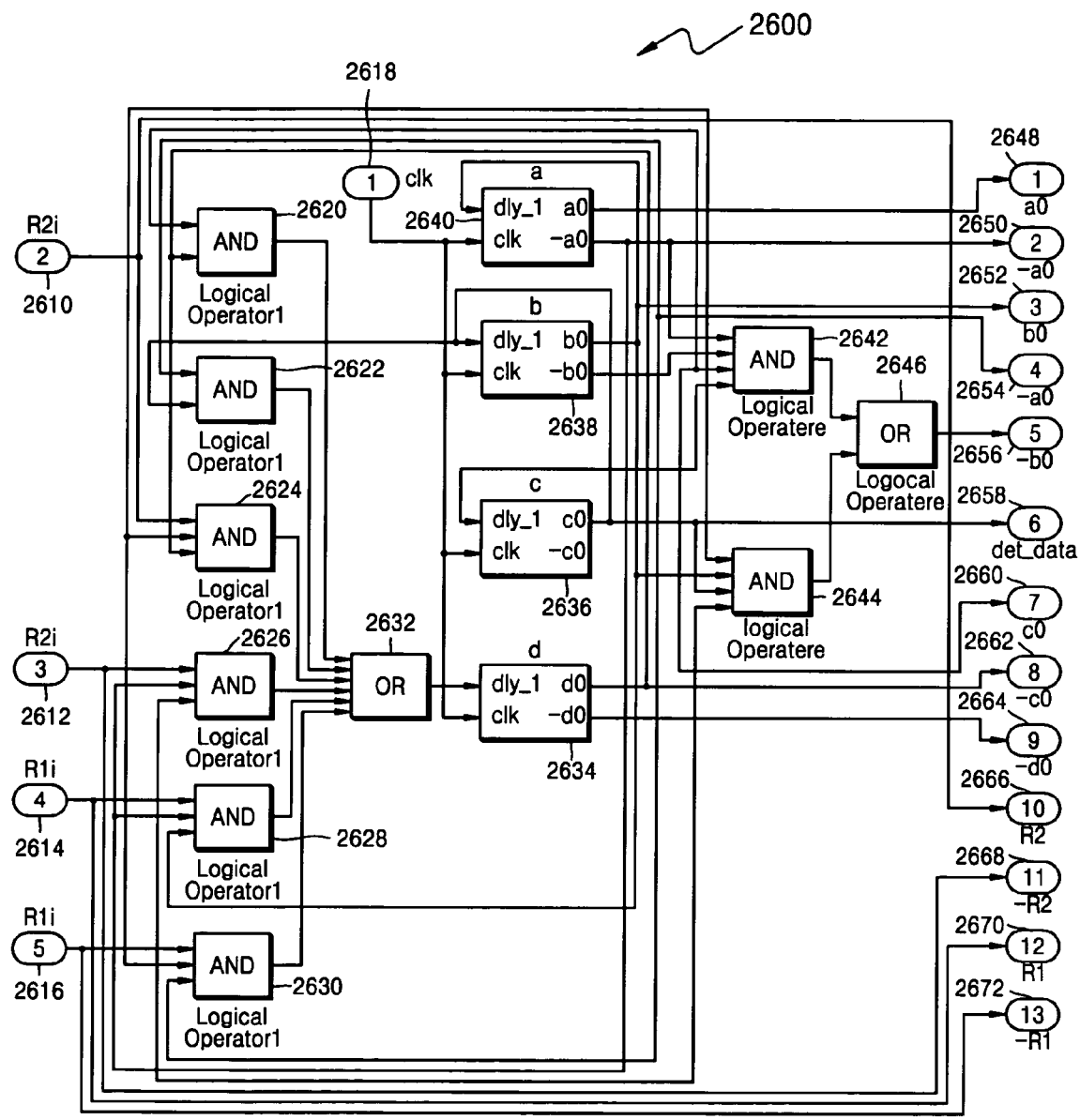
FIG. 26 shows a schematic circuit diagram for a Next State and Decoder Output Generator in accordance with an embodiment of the present disclosure.

Turning to FIG. 26, a Next State and Decoder Output Generator is indicated generally by the reference numeral 2600. The generator 2600 includes input registers 2610, 2612, 2614 and 2616 as well as a clock register 2618. The generator also includes logical AND operators 2620, 2622, 2624, 2626, 2628 and 2630, 2642 and 2644, and logical OR operators 2632 and 2646. It further includes flip-flops 2634, 2636, 2638 and 2640. In addition, the generator has thirteen output registers 2648, 2650, 2652, 2654, 2656, 2658, 2660, 2662, 2664, 2666, 2668, 2670 and 2672.

The input register 2610 is connected in signal communication with the AND operator 2624 and a tenth output register 2666. The input register 2612 is connected in signal communication with the AND operator 2626 and an eleventh output register 2668. The input register 2614 is connected in signal communication with the AND operator 2628 and a twelfth output register 2670. The input register 2616 is connected in signal communication with the AND operator 2630 and a thirteenth output register 2672. The AND operators 2620, 2622, 2624, 2626, 2628 and 2630 are each connected in signal communication with the OR operator 2632. The OR operator 2632, in turn, is connected in signal communication with a D input of the flip-flop 2634.

The flip-flop 2634 has a d0 output connected in signal communication with an eighth output register 2662 for providing d0 and a NOT d0 output connected in signal communication with a ninth output register 2664 for providing NOT d0. The flip-flop 2636 has a c0 output connected in signal communication with a sixth output register 2658 for providing c0, connected in signal communication with a D input of the flip-flop 2638, and connected in signal communication with the AND operator 2644. The flip-flop 2636 has a NOT c0 output connected in signal communication with the AND operators 2642 and 2620, and connected in signal communication with a seventh output register for providing NOT c0. The flip-flop 2638 has a b0 output connected in signal communication with a third output register 2652 for providing b0, connected in signal communication with a D input of the flip-flop 2640, and connected in signal communication with the AND operators 2644 and 2628. The flip-flop 2638 has a NOT b0 output connected in signal communication with the AND operators 2642, 2630 and 2622, and connected in signal communication with a D input of the flip-flop and connected in signal communication with a fourth output register 2654 for providing NOT b0. The flip-flop 2640 has a a0 output connected in signal communication with the AND operators 2644, 2624 and 2630, and connected in signal communication with a first output register 2648 for providing a0. The flip-flop 2640 has a NOT a0 output connected in signal communication with the AND operators 2642, 2628 and 2626, and connected in signal communication with a second output register 2650 for providing NOT a0. The AND operators 2642 and 2644 are connected in signal communication with the OR operator 2646, which, in turn, is connected in signal communication with a fifth output register for providing det_data.

Figure 27:
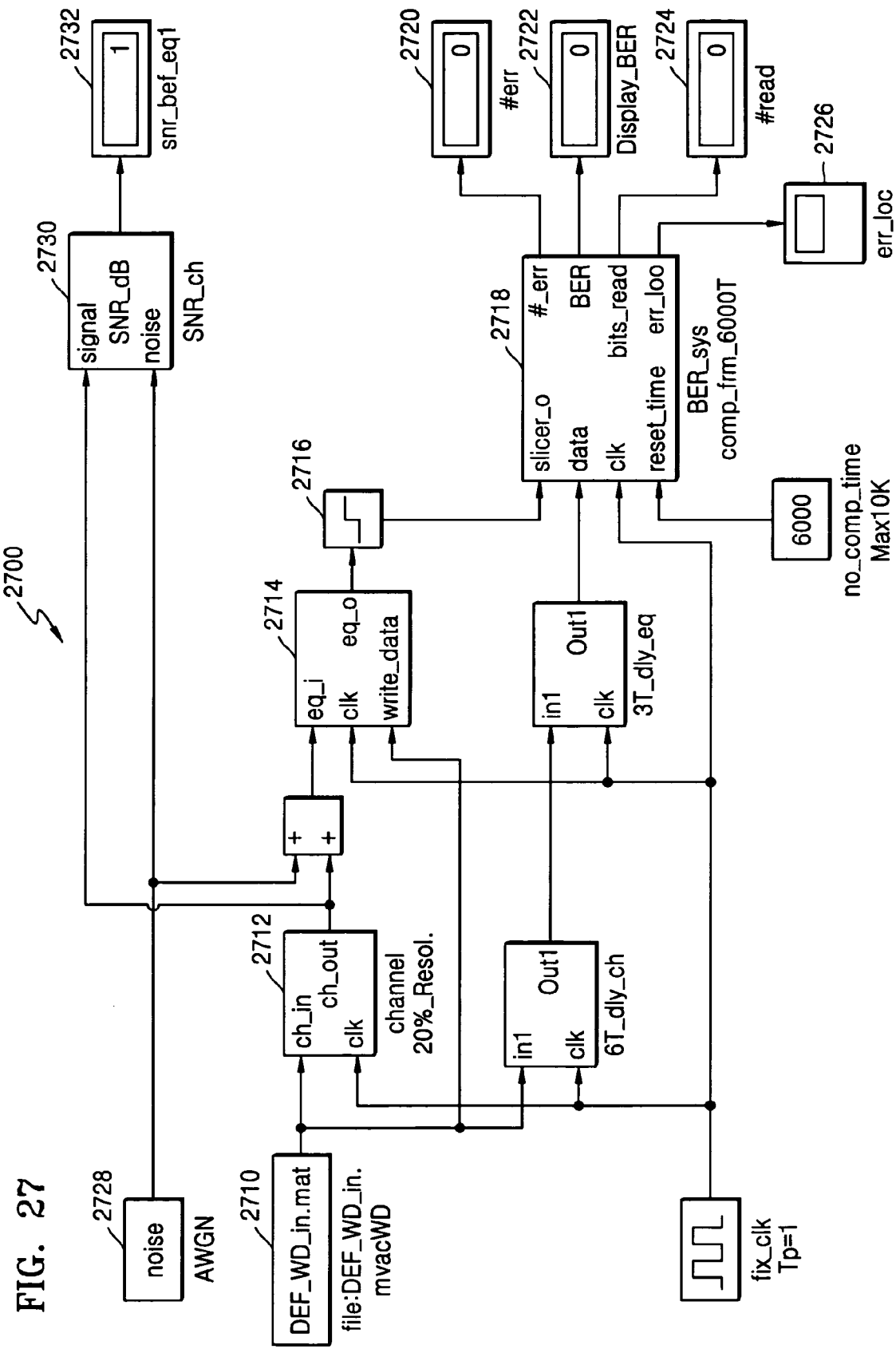
FIG. 27 shows a schematic circuit diagram of a BER Simulator for a Data Slicer.

Turning now to FIG. 27, a BER Simulator model for a Data Slicer is indicated generally by the reference numeral 2700. The model 2700 includes a digital front end (DFE) block 2710 to generate encoded write data. The DFE block 2710 is connected in signal communication with a channel simulator block 2712 for simulating signal from media. The channel block 2712 is connected in signal communication to an equalizer block 2714 for implementing finite impulse response (FIR) equalization. The equalizer block 2714, in turn, is connected in signal communication with a slicer block 2716. The slicer block is connected in signal communication with a bit error rate (BER) block 2718 for measuring bit error rate as well as displaying outputs such as the number of bits in error 2720, BER 2722, the number of bits read 2724 and error location 2726. The model 2700 further includes a noise generation block 2728 connected in signal communication with a signal-to-noise-ratio (SNR) block 2730, which provides an output 2732 of SNR before equalization.

Figure 28:
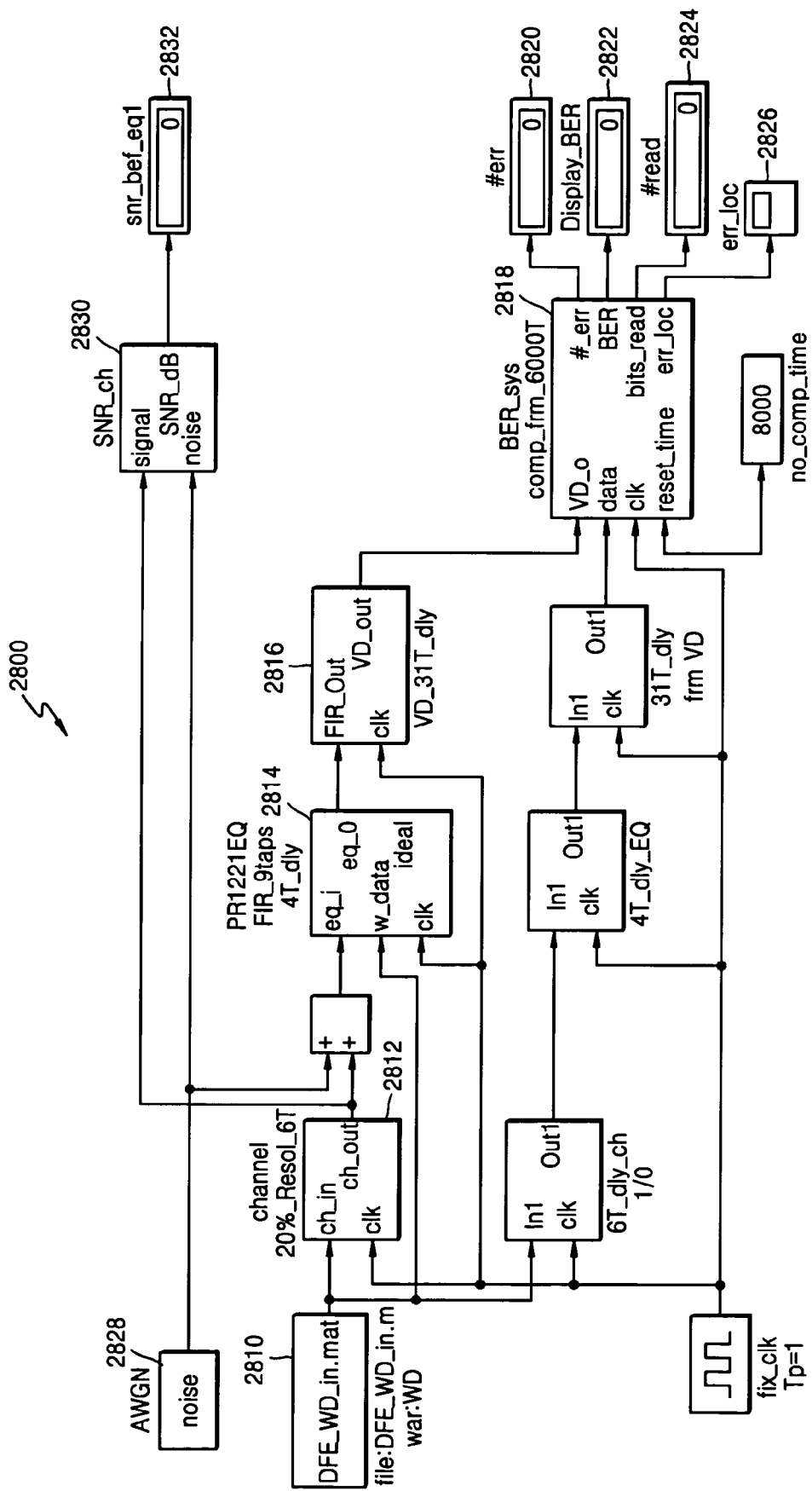
FIG. 28 shows a schematic circuit diagram of a BER Simulator for a PRML 1221 Viterbi Detector.

As shown in FIG. 28, a BER Simulator model for a PRML 1221 Viterbi Detector is indicated generally by the reference numeral 2800. The model 2800 includes a digital front end (DFE) block 2810 to generate encoded write data. The DFE block 2810 is connected in signal communication with a channel simulator block 2812 for simulating signal from media. The channel block 2812 is connected in signal communication to an equalizer block 2814 for implementing PR 1221 equalization. The equalizer block 2814, in turn, is connected in signal communication with a Viterbi detector block 2816. The Viterbi block is connected in signal communication with a bit error rate (BER) block 2818 for measuring bit error rate as well as displaying outputs such as the number of bits in error 2820, BER 2822, the number of bits read 2824 and error location 2826. The model 2800 further includes a noise generation block 2828 connected in signal communication with a signal-to-noise-ratio (SNR) block 2830, which provides an output 2832 of SNR before equalization.

Figure 29:
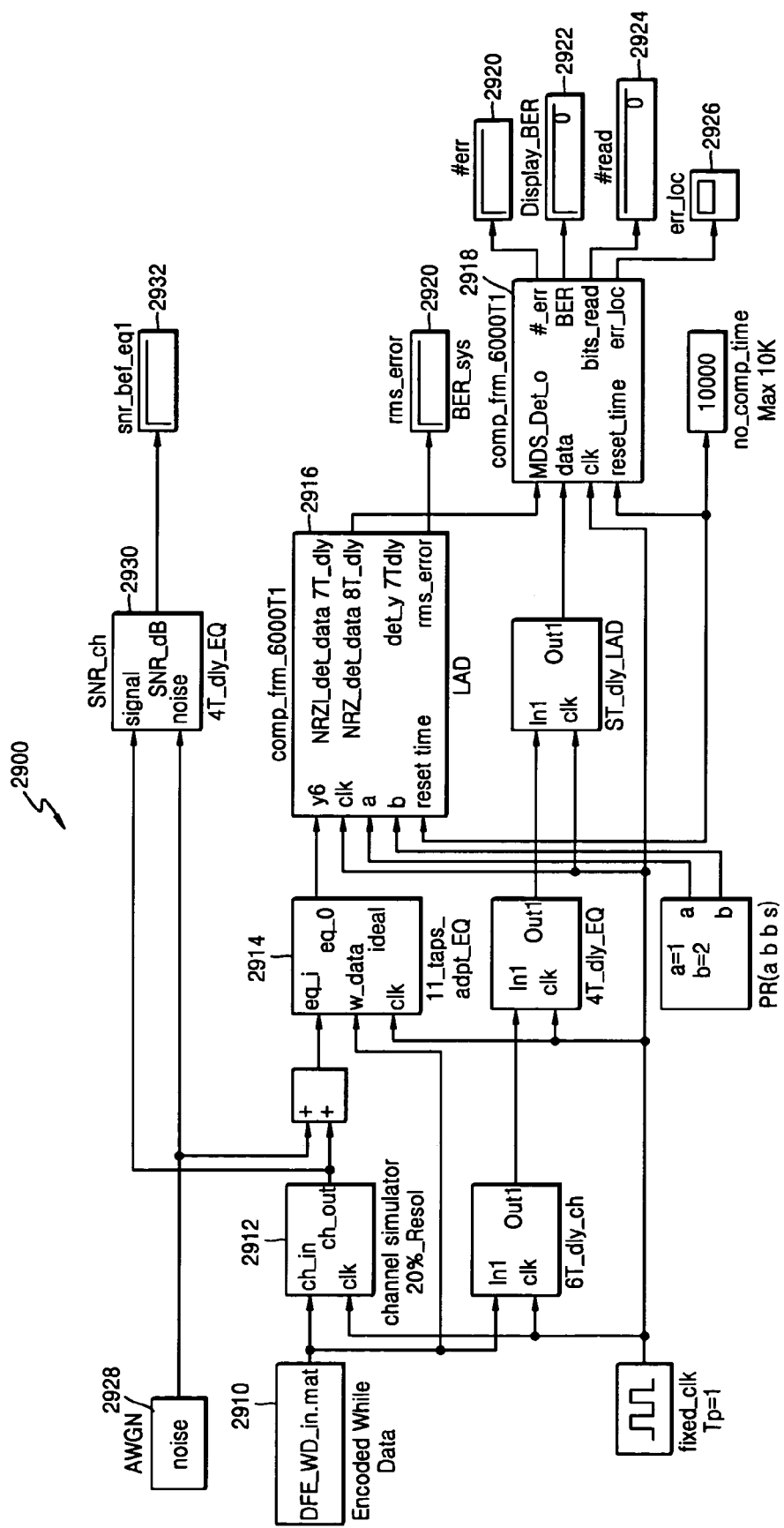
FIG. 29 shows a schematic circuit diagram of a BER Simulator for a detector in accordance with an embodiment of the present disclosure.

Turning to FIG. 29, a BER Simulator model for a PR12321 look-ahead maximum-likelihood data detector embodiment of the present disclosure is indicated generally by the reference numeral 2900. The model 2900 includes a digital front end (DFE) block 2910 to generate encoded write data. The DFE block 2910 is connected in signal communication with a channel simulator block 2912 for simulating signal from media. The channel block 2912 is connected in signal communication with an equalizer block 2914 for implementing PR 12321 equalization. The equalizer block 2914, in turn, is connected in signal communication with a look-ahead detector (LAD) block 2916. The LAD block is connected in signal communication with a bit error rate (BER) block 2918 for measuring bit error rate as well as displaying outputs such as the number of bits in error 2920, BER 2922, the number of bits read 2924 and error location 2926. The model 2900 further includes a noise generation block 2928 connected in signal communication with a signal-to-noise-ratio (SNR) block 2930, which provides an output 2932 of SNR before equalization.

Figure 30:
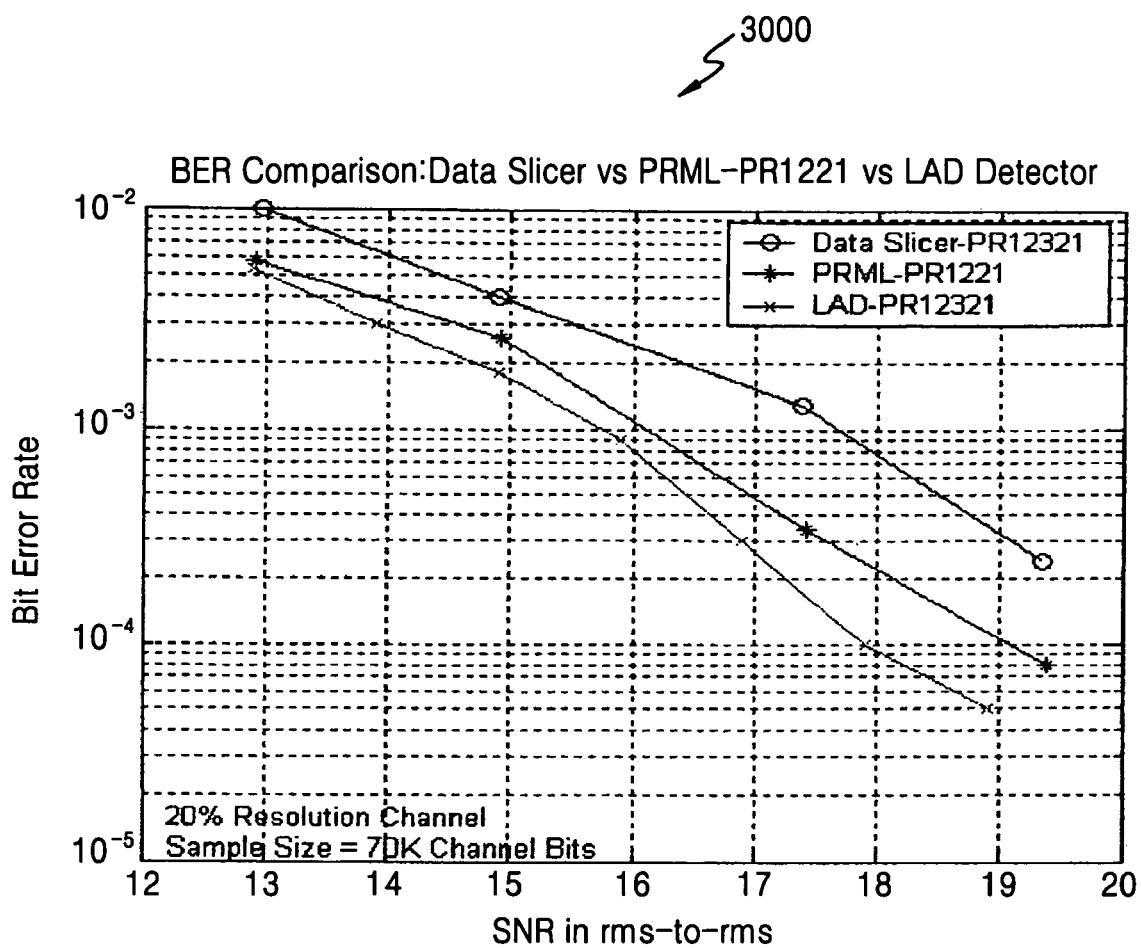
FIG. 30 shows a graphical diagram of BER versus SNR for the channels under comparison for Data Slicer PR 12321 versus Viterbi PR 1221 versus the embodiment PR 12321 in accordance with FIGS. 27, 28 and 29.

Turning now to FIG. 30, BER versus SNR plots of the channels under comparison for Data Slicer PR 12321 versus Viterbi PRML 1221 versus the LAD 12321 embodiment of the present disclosure are indicated generally by the reference numeral 3000.

Figure 31:
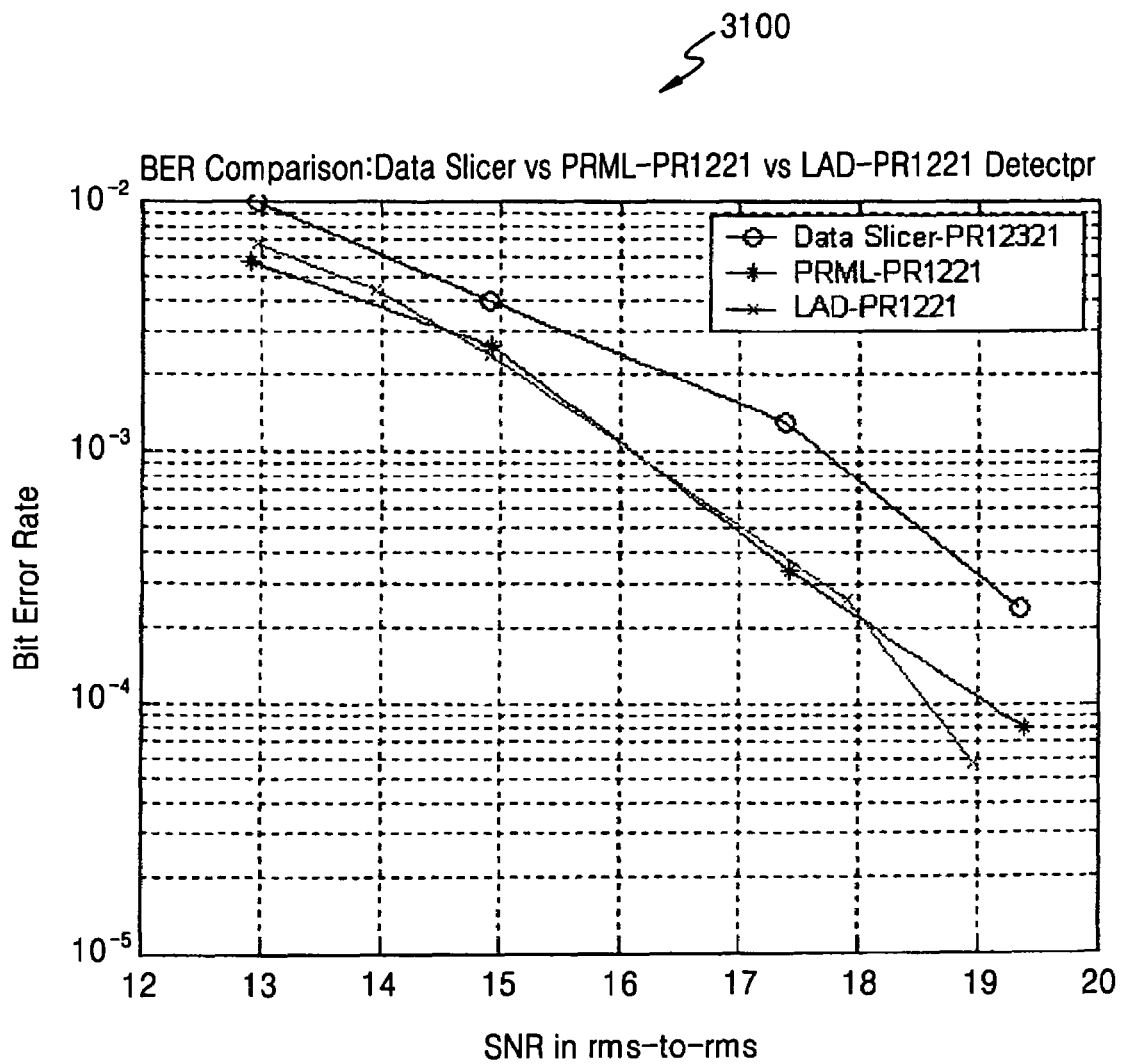
FIG. 31 shows a graphical diagram of BER versus SNR for the channels under comparison for Data Slicer PR 12321 versus Viterbi PR 1221 versus the embodiment PR 1221 in accordance with FIGS. 27 and 28 and an embodiment of the present disclosure.

As shown in FIG. 31, BER versus SNR plots of the channels under comparison for Data Slicer PR 12321 versus Viterbi PRML-VD 1221 versus the PRML-LAD 1221 embodiment of the present disclosure are indicated generally by the reference numeral 3100.

In addition to the gate count reduction, since the detector output is generated at a current time instead of at a delayed time as in the VD, the target sample value can be generated at the current time as well. Such target samples can be used to generate root-mean-square (RMS) sample error values, which, in turn, can be used as an indicator of the channel, where such an indicator is commonly called Channel Quality. Another application of such target sample values is for Noise Predictive Maximum Likelihood (NPML), where accurate sample errors are needed in order to adaptively set the taps in the NPML with a small convergence time.

The detection decision in this embodiment of the present disclosure is based on the physical shape of the input signal while VD is not. The decision criteria in this embodiment can be related to such signal attributes as signal transitions, either positive or negative, as well as top envelope and bottom envelope shapes. In this way, one can easily trace the cause of detector error related to the signal shape. For example, if the criterion related to the positive transition fails, resulting in a detector error, one can easily optimize the corresponding detection logic by altering a decision boundary limit. This implies that the embodiment of the present disclosure is capable of correcting nonlinear impairments, which was not possible with a VD since it was a linear detector. In addition, this embodiment overcomes the speed bottleneck inherent with the prior art VD where the Add-Compare-Select (ACS) operation had to be completed in one cycle.

In this embodiment, the Add (A) and Compare (C) operations are expressed in terms of inequality design equations, which can be readily implemented as a simple combinatorial logic. The Select (S) operation is the only operation needed to be completed in a clock cycle, which is a two-level logic. Therefore, no speed bottleneck exists which makes this embodiment of the present disclosure more suitable for Blue Rays applications where the signal bandwidth is substantially wider than the DVD counterpart. Thus, this embodiment is applicable to both the Blue Disk (BD) and High Definition DVD (HD DVD) formats for drives employing blue lasers.

The procedure used for deriving such design equations is as follows: find a state at t=k with two branches leaving from it. A group of paths leaving at one of the two next states at t=k+1 is compared with the other group of paths leaving at the other next state at t=k+1. A pair of paths which has a minimum Euclidian distance is kept and a condition for which group (or next state) should be selected is obtained as an inequality equation. In this way, only the select (S) operation is needed to be completed during one clock cycle while the other two operations of Add and Compare are done a priori outside this cycle in combinational logic. Similarly, the same is repeated for other states that have two branches leaving into the next sample time.

This embodiment of the present disclosure exploits the fact that the optical disk is interchangeable media while the hard disk is not. This interchangeable feature means that once the encoding scheme is fixed for a given media, such as CD, DVD, HD DVD or Blue Disk, the decoding must be designed for such a fixed encoding scheme. While the hard disk drive, being a subsystem including fixed media, has freedom of choosing an optimum combination of encoding and decoding schemes.

For example, CD and DVD use the encoding schemes called eight-to-fourteen modulation (EFM) and EFM+, respectively, while Blue Disk (BD) uses the encoding scheme called (1,7) PP. Such encoders are called (d, k) RLL (Run Length Limited) where they share the common feature of d≠0. For CD and DVD, d=2 while for HD-DVD and BD, d=1.

This embodiment of the present disclosure makes use of the encoding constraint of d≠ 0 which simplifies a state diagram that facilitates the process of taking the AC (Add-Compare) operations out of the cycle. Due to the non-zero d constraint, the number of states requiring the ACS operation is substantially reduced.

In the conventional VD, at a given sample time, the ACS is performed at each state which has two branches arriving at it from one sample time before. After the ACS, each state is left with one survival path, which must be stored in a path memory. The path memory length is dependent on the channel memory, which is increased from DVD to BD due to the increase in the areal density in BD. That is, BD has higher number of tracks per inch (TPI) radially and bits per inch (BPI) in track than DVD, where the product of the two defines the areal density. For example, a typical path memory for DVD is 8 by 24 array of D-type flip-flops (D-FFs), which take up die area and must be clocked consuming the active power.

Unlike the prior art VD, embodiments of the present disclosure use future samples instead of past samples. Thus, at a given sample time, all paths in the future sample times are considered, which are connected to each of two branches leaving (in VD it is arriving) the state at the present time. Since this embodiment of the present disclosure uses future samples, it is called a look-ahead detector (LAD). Therefore, the output is available at a present time without requiring a path memory.

Embodiments disclosed herein include method and apparatus useable in an optical disk system and employing a look-ahead detection technique based on the boundary decision to minimize noise boost by using a higher order polynomial for equalization with a minimum hardware complexity.

For explanatory purposes, an exemplary digital playback system is described that incorporates one or more embodiments as disclosed herein. The digital playback system allows playback of optical disks such as compact discs (CDs), digital video or versatile discs (DVDs) and blue-ray discs (BD), which may include data, audio, video, and combinations thereof.

The digital playback system includes an optical disc, an optical disc motor that rotates the optical disc, servo drivers that control the speed of the disc motor, and an optical pickup unit (OPU) that senses information stored on the optical disc and generates a signal in response thereto. In the case of CDs, the information stored on the optical disc is in the form of pits. The OPU includes circuitry, typically a laser (e.g., single beam, triple beam, etc.), for sensing the pits on the optical disc. The arrangement of pits on CDs is different from the arrangement of marks on DVDs and BDs. Consequently, the OPU is capable of sensing different arrangements of pits and marks on the optical disc.

The OPU is coupled to a read channel and provides the pick up signal to the read channel. In one embodiment, the pick up signal is an analog signal. The read channel includes, among other components, an equalizer and a data slicer detector and a clock recovery block. The clock recovery block is typically a Phase Lock Loop (PLL), which recovers a clock signal from the pick up signal. The recovered clock signal is transmitted to the data detector. The equalizer boosts the pickup signal while minimizing noise and the data detector detects signal transitions containing the transmitted data and generates a digital data stream.

The output of the data detector is coupled to a digital signal processor (DSP), which, among other things, provides signal processing functionality. The DSP can process the signal into different formats such as formats compatible with CDs, DVDs and BDs. More specifically, for DVDs and BDs, the DSP may provide synchronization, demodulation of data, ECC error correction, descrambling, EDC and IED detection, authentication (e.g., CSS, CPPM, CPRM), and buffer management. For CDs, the DSP may provide analog to digital conversion, demodulation (e.g., Eight-to-Fourteen "EFM" demodulation), and error correction. The DSP also provides memory resources for facilitating signal processing functionality.

Additionally, the DSP includes servo and disc motor control functionality. In particular, the DSP recognizes errors in the pick-up signal, generates error signals in response thereto, and transmits the error signals to the servo drivers. Examples of error signals include spindle motor control, optical pickup, focus, and tracking (of OPU). The DSP calculates servo error control signals, which typically include a focus error signal, tracking error signal, and a track-crossing pulse signal. The DSP may calculate several closed-loop servos, including a disc motor servo, focus servo, and tracking servo. Based on the servo error control signals, the DSP outputs control voltages to the servo drivers to correct the rotation speed, to move the sled which houses the OPU to the proper track, to move up or down the OPU to a proper distance from the disc, or to correct the off-track error.

The DSP further provides an interface to a Motion Picture Experts Group (MPEG) decoder. The digital output stream outputted from the DSP to the MPEG decoder may be in one of a number of formats including, but not limited to, compact disc digital audio (CD-DA) data, as defined by the Red Book standard, compact disc read-only memory (CD-ROM) data, as defined by the Yellow Book standard, or an MPEG program stream. The DSP handles CD/DVD/BD bit streams, including support of special effects. The MPEG decoder is coupled to a memory, video playback subsystem, and audio playback subsystem.

The MPEG decoder decodes the data stream received from the DSP, converts it into video data and/or audio data, in one of a number of selected formats, for output to video and audio subsystems, respectively. In one embodiment, the MPEG decoder is an MPEG-II decoder, which receives a MPEG-II data stream from the DSP and converts the data stream into digital audio and video outputs. MPEG decoder extracts timing information from the MPEG data stream, and de-multiplexes the compressed MPEG data stream into decompressed audio and video data streams. The MPEG decoder generally includes a MPEG audio decoder, which decompresses and decodes the compressed MPEG audio stream to produce a decompressed audio data stream, and a MPEG video decoder that decompresses and decodes the compressed MPEG video data stream to produce a decompressed video data stream. The decompressed video and audio streams may then be forwarded to video and audio playback subsystems for playback. The timing information extracted by the MPEG decoder is used to synchronize the audio and video outputs. The optional memory provides memory resources for the decoding process.

A microcontroller is coupled to the DSP, MPEG decoder, and other devices for controlling the operation of the digital playback system. It is to be appreciated that a microprocessor, gate array, or other device(s) may be used instead of the microcontroller as the central processing unit of the digital playback system. The microcontroller may be coupled to volatile memory (and/or internal volatile memory, not shown) for executing instructions, storing data and variables, etc. A non-volatile memory such as a read-only memory (ROM), Flash, or the like, stores program code for execution by the microcontroller to control operation of the digital playback system. The program code, stored in non-volatile memory, may be loaded into volatile memory at startup for execution by microcontroller. The microcontroller may also be coupled to a CPU (not shown) of the entire system in which digital playback system is implemented for communication therewith.

Operation of exemplary embodiments will now be described with reference to the Figures, as introduced above. It shall be understood that the given embodiments are merely exemplary, and that those of ordinary skill in the pertinent art may choose various options in form and details without departing from the scope of this disclosure.

Referring back to FIG. 1, a Partial-Response-Maximum-Likelihood (PRML) block may be used in an IC for optical disk drives. An embodiment of the present disclosure may be used to define the detector block in the figure. A detector embodiment of the present disclosure may use a look-ahead-detector (LAD). As discussed, the conventional Viterbi detector (VD) has been widely used due to its proven technology in hard disk drive (HDD) applications, and in spite of the disadvantages mentioned here including power and die size.

Referring back to FIG. 2, four different partial response channel magnitudes are shown, which can be considered for optical channels. Such functions can be expressed as a general polynomial with variable coefficients of a, b, c, d, and e:

$$H(D)=a+bD+cD^2+dD^3+eD^4$$

where D is a delay operator.

This equation is often called a Modulated Transfer Function (MTF) because a readback signal from media is equalized to produce same samples as in the impulse response described in this equation. Selection criteria include choosing an MTF similar to the frequency response magnitude of a given head and media interface. Here, two cases are chosen for which a=1, b=2, c=3, d=2 and e=1, referred to here as PR12321 and a=1, b=2, c=2, d=1 and e=0, referred to here as PR1221. It will be shown that two LAD detectors may be constructed for these two polynomials as embodiments of the present disclosure.

Referring back to FIG. 3, target sample values for these respective polynomials are provided, which are ideal for a given detector. For the channel equalized for the PR12321 embodiment, the number of levels is eight, while the number of levels is five for the PR1221 embodiment.

Referring back to FIG. 4, the look-ahead detector according to one embodiment of the present disclosure uses a boundary function generator followed by a boundary decision logic block, a block for next state and detector outputs and logic for determining the target samples, which, in turn, is fed to a channel quality monitor (CQM) block. Since the detector output is in NRZI format, it is converted to NRZ format. For example, the detector outputs . . . 00100100 . . . , which will be converted by this block to . . . 0011100 . . . in NRZ format.

Referring back to FIG. 5, this embodiment of the present disclosure operates as a finite state machine (FSM) with structure based on the state diagram of FIG. 5. In this diagram, the polynomial for the MTF is chosen to be PR1221. As seen in FIG. 5, there exist only 6 states out of 8 possible states due to the (2, 10) EFM+ constraint. One can derive the similar diagram for PR12321, where 8 states exist out of 16 possible states due to the same reason as for PR1221.

In FIG. 5, it can be readily seen that the left and right halves constitute the image of each other in terms of the state and the branch. For example, the state 0 in hex has the image state of 7 in decimal, etc. The branch from state 0 to 0 is the image of the branch from 7 to 7, etc. In addition, the left half represents the positive transition while the right half represents the negative transition. The property mentioned here will be explored to derive the boundary functions as well as to facilitate the hardware design.

The detection method of this embodiment is based on the signal shape. In the optical recording channel, data information stored in the media is embedded in zero crossings of the signal while its envelope can also affect the data detection decision. Error is prevented if the signal is not impaired such that its zero crossings occur at wrong timings or its envelopes deviate from ideal shape.

The decision logic is categorized based on whether it is related to transition detection or envelope detection. In this way, one can easily trace the source of error, if any and adjust the corresponding boundary offset to minimize error probabilities.

Referring back to FIG. 6, the trellis is drawn from FIG. 5 over 6 samples, $y_0, y_1, y_2, y_3, y_4,$ and $y_5$ where $y_0$ is the sample at t=k (current time) while the other 5 samples are at future sample times of t=k+1, k+2, k+3, k+4 and k+5, respectively. Since the detector uses such future samples, the detector is called a look-ahead-detector (LAD).

From FIG. 6, one can see that there exist only two states from which two branches are leaving to the respective next states. For example, the state 0 has two branches arriving at state 0 and state 1 at next sample time. As previously mentioned, there exists a symmetry property among these four states. For example, the states 0, 1 and 4 are the images of states 7, 6 and 3, respectively. Such symmetry properties can be exploited to facilitate the hardware design such that the decision circuits used for state 0 can be readily reused for state 7 just by inverting the signs of the samples involved in the process as would be seen as in the subsequent sections.

First, since the state 0 branches out to either state 0 or 1, a decision has to be made which branch should be taken given a current sample, $y_0$. FIG. 7 shows all possible paths over six samples, $y_0$, $y_1$, $y_2$, $y_3$, $y_4$ and $y_5$ starting at state 0 at t=0 via state 0 and state 1. All the paths via state 0 are grouped as P group while all the paths via state 1 is grouped as Q group.

The Euclidian distance squared is calculated for all permutations between two groups and shown in FIG. 8. The table in FIG. 8 is used to derive boundary functions related to the positive transition such that only P5 through P9 from P group are used as indicated in the table. From this table, it is seen there exist three pairs with the minimum distance property, which are P7/Q2, P8/Q3 and P9/Q4. These three produce an optimum boundary function, Fa that separates the P5-P9 from Q1-Q4 but not for Q1. FIGS. 9 and 10 show two of such pairs, that is, P7/Q2 and P9/Q4 pairs and also show how the boundary function, Fa and the corresponding decision logic variable, A are derived.

The minimum distance pairing for Q1 is with P7 as can be seen in FIG. 8. In FIG. 11, a new boundary function is obtained and denoted as Fb as well as a new decision logic variable, B.

Referring back to FIG. 12, a boundary is defined by ANDing the logic variables of A and B. Here, the Q group is separated at an equal distance from a subgroup of P group made up of P5 through P9. Since P5 through P9 are all positive transition paths, the decision on this boundary is called a positive transition check.

A description follows of how the boundary functions and decision logic are derived for detecting the signal envelope, specifically the signal bottom envelope at state 000.

From an experimental study, it is found that adding one more look-ahead-sample is advantageous, such that a new set of P and Q groups is constructed over a total of 7 samples instead of the 6 samples used for the transition check described previously. This is to enhance the detection capability when the envelope suffers from drooping close to the base line.

Referring back to FIG. 13, all the paths for the P and Q groups for state 000 are shown. As in FIG. 7, all the paths in the P group have a next state of 000 while those in Q group have a next state of 001. The number of p paths grows from 9 to 13 while the number of Q paths from 4 to 6 due to one extra look-ahead-sample.

Referring back to FIG. 14, it shows Euclidian distance squared for all pairs of P and Q groups for state 000. It turns out that the decision boundary logic would be the same whether 6 or 7 samples are used for the positive transition check. The bottom envelope check involves only P1 through P6 with Q group.

A boundary function, Fd is derived from any of two pairs P1/Q1 and P2/Q2, as shown in FIG. 15, where the decision logic variable D is also derived. Similarly, another boundary function Fe and the corresponding logic E are derived from a pair of P4 and Q3 as shown in FIG. 16. The third boundary function and logic can be derived from using either of P5/Q5 or P6/Q6, which each use Ff and F as shown in FIG. 17.

Referring back to FIG. 18, it shows the overall decision logic variable C that is a combinatorial logic of D, E and F as shown in the figure. The variable C determines the next state for state 000, that is, if C is true, the next state is 000, otherwise the next state would be 001 as would be the same for the variable, A*B in FIG. 12.

Referring back to FIG. 19, it shows an equation for a decision logic variable, R0 at state 000. The variable R0 is a logic variable by ORing the boundary decision logic variables, A0*B0 and C0 shown in FIGS. 12 and 18, respectively. In this figure, logic variables, A0, B0 and C0 are expressed with sample error terms where the sample targets are variables, px, pm, z, nm and nx for PR1221. Their typical values are: 3, 2, 0, −2 and 3, respectively, as shown in the figure. One could use the fixed values to reduce the number of terms in the equations.

Similarly, FIG. 20 shows a decision logic variable R7 for state 111. The same design can be used as for state 000 except the target sample values are inverted if the symmetry property holds on the target values.

Referring back to FIG. 21, it shows a table for R0, next state, target sample estimate and detector output for state 000 while FIG. 22 shows similarly for state 111.

Referring back to FIG. 23, it shows an equation for each bit of next state, which is defined as {a1, b1, c1}. It is noted that due to d=2 constraint in encoding, each minterm is reduced in size for the Equation 34 for c1. There are four minterms in Equation 34, where the size of each minterm is reduced due to the d=2 constraint. For example, the first minterm would have been (~R0)(~a0)(~b0)(~c0), which is reduced to (~R0)(~a0)(~c0) as shown in FIG. 23. This is because d=2 means there must be at least three zeros in a row. Thus, since a0 and c0 are "0", b0 is always "0" so b0 drops out of the equation.

Referring back to FIG. 24, it shows an equation for detector output. It is noted that the output is in NRZI format, that is "1" means a transition, not a level. This has to be converted to NRZ format in a following block.

For a given branch defined from the current state to the next state, the sample value can be predicted. This can be used for channel quality monitoring. In real time, the monitor tracks signal RMS error, which can be readily calculated from this detected sample value given a received sample value. In FIG. 25, a table shows logic equation for each target sample value.

Referring back to FIG. 26, the next state is determined as well as the data is decoded from boundary decisions of R0 and R7 from FIGS. 19 and 20, respectively. It is noted here that only the two levels of logic, AND-OR, limit the speed of this embodiment of the present disclosure while the PRML Viterbi detector is limited by the operation called Add-Compare-Select (ACS), which is notorious for its speed bottleneck. Because of the ACS bottleneck, a parallel design is required for a high-speed application using VD, resulting in hardware complexity. Embodiments of the present disclosure have a clear advantage in this regard.

The order of the polynomial for the PRML Viterbi detector is chosen as known in the art, where the order is three. The exemplary embodiment of the present disclosure is used with a fourth order polynomial. Even with the higher-order polynomial, the hardware complexity for the embodiment of the present disclosure is significantly less than that for the VD. In the PRML VD case, the radix-4 design is used for a high-speed application where two stages of trellis are combined into one for the decimation factor of two. In such an implementation, the decoding process is carried on every other clock cycle, requiring a doubling in hardware.

TABLE 1

Hardware Complexity Comparison: PRML Viterbi Detector versus a detector embodiment of the present disclosure.

|  | Embodiment | PRML(1) |
| --- | --- | --- |
| Adder | 17 | 56 |
| D-FF | 10 | 308 |

TABLE 1-continued

Hardware Complexity Comparison: PRML Viterbi Detector versus a detector embodiment of the present disclosure.

|  | Embodiment | PRML(1) |
|---|---|---|
| Comparator | 12 | 15 |
| Mux | 10 | 100 |
| AND | 22 | 0 |
| OR | 10 | 0 |
| Performance: | 1dB better(2) | |

Notes:
(1)PRML Radix 4 Design for 20× DVD, CSA instead of ACS
(2)Improvement due to a higher order target channel than PR 1221, $1 + 2D + 2D^2 + D^3$ The exemplary embodiment is compared in terms of the bit error rate (BER) with the conventional data slicer and the competing Viterbi detector technology whose models are shown in FIGS. 27 and 28, respectively.

The input pattern is random such that all possible wavelengths are used in a random order and followed by the inverted version per cycle. From the input pattern, the analog waveform is generated using the well-known cosine channel model whose parameters are adjusted to produce 20% resolution. The resolution is defined as the ratio of the shortest wavelength peak to the longest wavelength peak.

Referring back to FIG. 27, the data slicer model uses a 7-tap adaptive equalizer while the Viterbi is required for the 9-tap counterpart. The reason is that since Viterbi is used for the $3^{rd}$ order polynomial, a higher order equalizer is needed, resulting in 9 taps rather than 7 taps used in the data slicer and the embodiment of the present disclosure whose BER model is shown in FIG. 29. As seen in the subsequent discussion, this is part of the reason why the Viterbi performance is exceeded by the embodiment of the present disclosure simply because Viterbi suffers from high frequency noise boost due to the fact that the target MTF polynomial is in the $3^{rd}$ order while the embodiment of the present disclosure uses a $4^{th}$ order instead.

Referring back to FIG. 30, the embodiment of the present disclosure performs the best. It is noted here that since the sample size is only 70,000 bits read, the BER data in high SNR range is not accurate but still good enough for relative comparisons. For example, the embodiment of the present disclosure is error free at 20 dB SNR for this sample size.

An advantage of this embodiment of the present disclosure comes from the fact that it allows the use of a higher order polynomial to minimize high frequency noise boost due to equalization while the Viterbi approach is limited to a lower order polynomial for hardware complexity. Since the speed of the embodiment is only limited to two levels of logic, the embodiment allows high-speed application more readily than the Viterbi counterpart.

Referring back to FIG. 31, the same partial response channel is used for both Viterbi detector and another embodiment of the present disclosure, which is referred to here as PR1221. This embodiment uses less hardware.

Thus, a method and apparatus for an optical disk system employing a look-ahead data detection technique have been provided where an optimum detection is achieved with a minimum hardware complexity. Due to simplified hardware, embodiments of the present disclosure allow a higher order polynomial for the modular channel transfer function to increase the reliability and reduce the equalizer hardware while minimizing noise.

In one exemplary embodiment, the boundary functions and the corresponding boundary decisions are derived for next state determination using only selected pairs including minimum distance pairs for each state over the look-ahead samples, thereby reducing the detector hardware significantly relative to the Viterbi counterpart where the most likely occurring path is searched at every state. Depending on the sample quality, the limits for the boundary decisions can be programmable to combat the channel impairments like misequalization, signal asymmetry, and the like.

Using the look-ahead samples, the hardware complexity of the present detector is significantly reduced due to no need for tracing back the past tentative decisions as was the case in the conventional Viterbi detector.

Where a bottleneck in Viterbi detectors for high-speed applications is that ACS (Add-Compare-Select) operations must be done within a cycle, resulting in a parallel implementation, embodiments of the present disclosure can be implemented such that speed is limited only by two-level logic so no parallel design is required, even for the highest DVD speed. Embodiments of the present disclosure are readily applicable to the blue laser system, which uses even higher speeds.

These and other features and advantages of the present disclosure may be readily ascertained by one of ordinary skill in the pertinent art based on the teachings herein. It is to be understood that the teachings of the present disclosure may be implemented in various forms of hardware, software, firmware, special purpose processors, or combinations thereof.

Most preferably, the teachings of the present disclosure are implemented as a combination of hardware and software. Moreover, the software is preferably implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present disclosure is programmed. Given the teachings herein, one of ordinary skill in the pertinent art will be able to contemplate these and similar implementations or configurations of the present disclosure.

Although illustrative embodiments have been described herein with reference to the accompanying drawings, it is to be understood that the present invention is not limited to those precise embodiments, and that various changes and modifications may be effected therein by one of ordinary skill in the pertinent art without departing from the scope or spirit of the present invention. All such changes and modifications are intended to be included within the scope of the present invention as set forth in the appended claims.

What is claimed is:

1. A look-ahead data detector for an optical disc system that performs a selection function from among a plurality of functions of a Viterbi detector, comprising:

a processor: a boundary function generator in a signal communication with the processor for generating a plurality of decision logic variables A0L, A0R~F0L, F0R, A7L, A7R~F7F, and F7R at states 0 and 7 by applying a value of a current sample y0 that converts information stored in the optical disc system, values of consecutively input six future samples y1-y6, and estimating values of target samples px, pm, a, nm, and nx to a predetermined boundary function;

a boundary decision unit in a signal communication with the processor for generating a plurality of boundary decision logic values R0, −R0, R7, and −R7 at the states 0 and 7 by using the plurality of decision logic variables A0L, A0R~F0L, F0R, A7L, A7R~F7F, and F7R; and a next state generator in a signal communication with the processor for deciding a next state by using the plurality of boundary decision logic values R0, −R0, R7, and −R7, wherein the boundary function generator, if the state 0 is at time t=k, separates all available output paths having consecutively input samples after time t=k+1 into two groups P and Q including the output paths via a next state 0 at the time t=k+1 and including the output paths via the next state 1 at the time t=k+1, calculates a Euclidian distance squared for corresponding permutation pairs included in the two groups, the boundary function being generated using a minimum distance event selected according to a selection value obtained from an inequality design equation of the Euclidian distance squared.

2. The look-ahead data detector of claim 1, wherein the plurality of decision logic variables A0L, A0R~F0L, F0R, A7L, A7R~F7F, and F7R is decided according to an outline shape of a zero crossing signal corresponding to data information stored in the optical disc system.

3. The look-ahead data detector of claim 2, wherein the plurality of boundary decision logic values R0, −R0, R7, and −R7 comprises:
 a decision logic value R0 at the state 0;
 an inverse decision logic value −R0 having an inverse value of the decision logic value at the state 0;
 a decision logic value R7 at the state 7;
 an inverse decision logic value −R7 having an inverse value of the decision logic value at the state 7.

4. The look-ahead data detector of claim 3, wherein the decision logic value R0 at the state 0 is satisfied when R0=A0 * B0C0, wherein
 if A0L≦A0R, A0 has a value 1, and if A0L>A0R, A0 has a value 0,
 if B0L≦B0R, B0 has a value 1, and if B0L>B0R, B0 has a value 0,
 and C0=D0+E0*F0, wherein
 if D0L≦D0R, D0 has a value 1, and if D0L>D0R, D0 has a value 0,
 if E0L≦E0R, E0 has a value 1, and if E0L>E0R, E0 has a value 0,
 if F0L≦F0R, F0 has a value 1, and if F0L>F0R, F0 has a value 0,
 A0L=|y0−nx|+|y1−nm|+|y2−z|+|y3−pm|,
 A0R=|y0−nm|+|y1−z|+|y2−pm|+|y3−px|,
 B0L=|y0−nx|+|y1−nm|+|y2−z|+|y4−pm|+|y5−z|,
 B0R=|y0−nm|+|y1−z|+|y2−pm|+|y4−z|+|y5−nm|,
 D0L ‖y0−nx|+|y1−nx|+|y2−nx|+|y3−nx|+|y4−nx|+|y5−nx|,
 D0R=|y0−nm|+|y1−z|+|y2−pm|+|y3−pm|+|y4−z|+|y5−nm|),
 E0L=‖y0−nx|+|y1−nx|+|y2−nx|+|y3−nx|+|y4−nm|+|y6−pm|,
 E0R=|y0nm|+|y1−z|+|y2−pm|+|y3−px|+|y4−pm|+|y6−nm|),
 F0L=‖y0−nx|+|y1−nx|+|y2−nx|+|y3−nm|+|y4−z|+|y5−pm|,
 F0R=|y0−nm|+|y1−z|+|y2−pm|+|y3−px|+|y4−px|+|y5−px|).

5. The look-ahead data detector of claim 3, wherein the decision logic value R7 at the state 7 is satisfied when R7=A7 * B7+C7, wherein
 if A7L≦A7R, A7 has a value 1, and if A7L>A7R, A7 has a value 0,
 if B7L≦B7R, B7 has a value 1, and if that B7L>B7R, B7 has a value 0,
 and C7=D7+E7*F7, wherein
 if D7L≦D7R, D7 has a value 1, and if D7L>D7R, D7 has a value 0,
 if E7L≦E7R, E7 has a value 1, and if E7L>E7R, E7 has a value 0,
 if F7L≦F7R, F7 has a value 1, and if F7L>F7R, F7 has a value 0,
 A7L=|y0−px|+|y1−pm|+|y2−z|+|y3−nm|,
 A7R=|y0−pm|+|y1−z|+|y2−nm|+|y3−nx|,
 B7L=|y0−px|+|y1−pm|+|y2−z|+|y4−nm|+|y5−z|,
 B7R=|y0−pm|+|y1−z|+|y2−nm|+|y4−z|+|y5−pm|,
 D7L=|y0−px|+|y1−px|+|y2−px|+|y3−px|+|y4−px|+|y5−px|,
 D7R=|y0−pm|+|y1−z|+|y2−nm|+|y3−nm|+|y4−z|+|y5−pm|,
 E7L=|y0−px|+|y1−px|+|y2−px|+|y3−px|+|y4−pm|+|y6−nm|,
 E7R=|y0−pm|+|y1−z|+|y2−nm|+|y3−nx|+|y4−nm|+|y6−pm|,
 F7L=|y0−px|+|y1−px|+|y2−px|+|y3−pm|+|y4−z|+|y5−nm|,
 R7R=|y0−pm|+|y1−z|+|y2−nm|+|y3−nx|+|y4−nx|+|y5−nx|.

* * * * *